(12) United States Patent
Faaborg et al.

(10) Patent No.: US 12,509,805 B2
(45) Date of Patent: *Dec. 30, 2025

(54) MANIPULATING AND ASSEMBLING MICRO- AND NANOSCALE OBJECTS WITH CAPILLARY FORCES

(71) Applicant: President and Fellows of Harvard College, Cambridge, MA (US)

(72) Inventors: Maya Faaborg, Cambridge, MA (US); Cheng Zeng, Cambridge, MA (US); Michael P. Brenner, Cambridge, MA (US); Yohai Bar-Sinai, Cambridge, MA (US); Ahmed Sherif, Cambridge, MA (US); Vinothan N. Manoharan, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/918,857

(22) Filed: Oct. 17, 2024

(65) Prior Publication Data

US 2025/0043472 A1 Feb. 6, 2025

Related U.S. Application Data

(63) Continuation of application No. 17/639,088, filed as application No. PCT/US2020/048596 on Aug. 28, 2020, now Pat. No. 12,146,247.

(Continued)

(51) Int. Cl.
*D04C 3/00* (2006.01)
*D01H 7/00* (2006.01)

(52) U.S. Cl.
CPC ................ *D04C 3/00* (2013.01); *D01H 7/00* (2013.01)

(58) Field of Classification Search
CPC ... D04C 3/00; D04C 3/48; D01D 5/00; D01D 5/0069; D01H 7/00
See application file for complete search history.

(56) References Cited

U.S. PATENT DOCUMENTS 8,017,864 B2     9/2011  Phillips
12,146,247 B2 *  11/2024 Faaborg .................. D04C 3/00
(Continued)

FOREIGN PATENT DOCUMENTS

KR      2010-0017402 A      2/2010
WO      WO-2016/151191 A1   9/2016
WO      WO-2018118785 A1 *  6/2018 ............. B33Y 30/00

OTHER PUBLICATIONS

Bowden et al., "Self-Assembly of Mesoscale Objects into Ordered Two-Dimensional Arrays," Science, Apr. 11, 1997, vol. 276, pp. 233-235.
(Continued)

*Primary Examiner* — Shaun R Hurley
(74) *Attorney, Agent, or Firm* — Wilmer Cutler Pickering Hale and Dorr LLP

(57) ABSTRACT

In some aspects, a device comprises a plurality of walls defining one or more channels; wherein the one or more channels have a cross-section in a plane perpendicular to a vertical axis of the device that changes along the vertical axis; and one or more floats sized to allow movement of the one or more floats within said one or more channels, wherein the one or more floats have a surface characteristic that is different from the surface characteristic of the walls such that, upon contact with a fluid, said walls and said floats form different contact angles and induce a repulsive capillary force between the walls and the one or more floats at a surface of the fluid.

22 Claims, 21 Drawing Sheets

Related U.S. Application Data

(60) Provisional application No. 62/894,042, filed on Aug. 30, 2019.

(56) References Cited

U.S. PATENT DOCUMENTS

| | | |
|---|---|---|
| 2006/0155328 A1 | 7/2006 | Foerster |
| 2007/0018361 A1 | 1/2007 | Xu |
| 2008/0233284 A1 | 9/2008 | Kim et al. |
| 2011/0189786 A1 | 8/2011 | Reches et al. |
| 2012/0034461 A1 | 2/2012 | Stevens |
| 2012/0135448 A1 | 5/2012 | Parker et al. |
| 2019/0024262 A1 | 1/2019 | Johnson |

OTHER PUBLICATIONS

Breen et al., "Design and Self-Assembly of Open, Regular, 3D Mesostructures," May 7, 1999, vol. 284, pp. 948-951.
Charvin et al., "Braiding DNA: Experiments, Simulations, and Models," Biophysical Journal, Jun. 2005, vol. 88, pp. 4124-4136.
Chen et al., "A New Peptide-Based Method for the Design and Synthesis of Nanoparticle Superstructures: Construction of Highly Ordered Gold Nanoparticle Double Helices," JACS, Sep. 19, 2008, vol. 130, pp. 13555-13557.
Costello, G.A., "Theory of Wire Rope," Mechanical Engineering Series, Second Edition, Springer Science & Business Media, New York, Oct. 10, 1997. 136 pages.
Dietz et al., "Folding DNA into Twisted and Curved Nanoscale Shapes," Science, Aug. 7, 2009, vol. 325, pp. 725-730.
Duan et al., "Directed Self-Assembly at the 10 nm Scale by Using Capillary Force-Induced Nanocohesion," Nano Letters, Aug. 12, 2010, vol. 10, pp. 3710-3716.
Ferreira, J.A., "Analytical computation of AC resistance of round and rectangular litz wire windings," IEE Proceedings-B, Jan. 1992, vol. 139, No. 1, pp. 21-25.
Freeman et al., "Reversible self-assembly of superstructured networks," Science, Nov. 16, 2018, vol. 362(6416): 808-813; Author manuscript May 16, 2019, and Supplementary Materials Oct. 4, 2018. 67 pages.
https://www.youtube.com/watch?v=uguY-cJnoxA, "Simple machine may pave the way for more powerful cell phones and WIFI", Oct. 26, 2022 (Year: 2022). 1 page.
International Search Report and Written Opinion mailed Nov. 20, 2020, in the International Application No. PCT/US20/48596. 10 pages.
Jiang et al., "Spinning continuous carbon nanotube yarns," Nature, Oct. 24, 2002, vol. 419, p. 801.
Kaplan et al., "Controlled growth and form of precipitating microsculptures," Science, Mar. 31, 2017, vol. 355, 1395-1399, pp. 1-4.
Lima et al., "Electrically, Chemically, and Photonically Powered Torsional and Tensile Actuation of Hybrid Carbon Nanotube Yarn Muscles," Science, Nov. 16, 2012, vol. 338, pp. 928-932.
Mastrangeli et al., "Challenges for Capillary Self-Assembly of Microsystems," IEEE Transactions on Components, Packaging, and Manufacturing Technology, Jan. 2011, vol. 1(1), pp. 133-149.
Morito et al., "Double-Helical Silicon Microtubes," Angew. Chem. Int. Ed., Apr. 12, 2010, vol. 49, pp. 3638-3641.
Murasugi, K., "Knot Theory and Its Applications" Birkhauser, Boston, MA (1996), 348 pages. (10 PDFs; parts 1 through 10).
Pokroy et al., "Self-Organization of a Mesoscale Bristle into Ordered, Hierarchical Helical Assemblies," Science, Jan. 9, 2009, vol. 323, pp. 237-240.
Py et al., "Capillary Origami: Spontaneous Wrapping of a Droplet with an Elastic Sheet," Physical Review Letters, Apr. 13, 2007, PRL 98, 156103, pp. 1-4.
Sullivan, C.R., "Optimal Choice for Number of Strands in a Litz-Wire Transformer Winding," IEEE Transactions on Power Electronics, Mar. 1999, vol. 14, No. 2, pp. 283-291.
Terfort et al., "Three-dimensional self-assembly of millimetre-scale components," Nature, Mar. 13, 1997, vol. 386, pp. 162-164.
Tien et al., "Crystallization of Millimeter-Scale Objects with Use of Capillary Forces," J. Am. Chem. Soc., Nov. 18, 1998, vol. 120, pp. 12670-12671.
Vella et al., "The 'Cheerios effect'," Am. J. Phys. (2005), vol. 73(9), pp. 817-825, arXiv:cond-mat/0411688v3, Jun. 25, 2007. 11 pages.
Wang et al., "Chiral Transformation: From Single Nanowire to Double Helix," JACS, Nov. 17, 2011, vol. 133, pp. 20060-20063.
Wu et al., "Racemic Helical Mesoporous Silica Formation by Achiral Anionic Surfactant," Chemistry of Materials (2006), vol. 18, pp. 241-243; published online Dec. 23, 2005.
Zhang et al., "Multifunctional Carbon Nanotube Yarns by Downsizing an Ancient Technology," Science, Nov. 19, 2004, vol. 306, pp. 1358-1361.

* cited by examiner

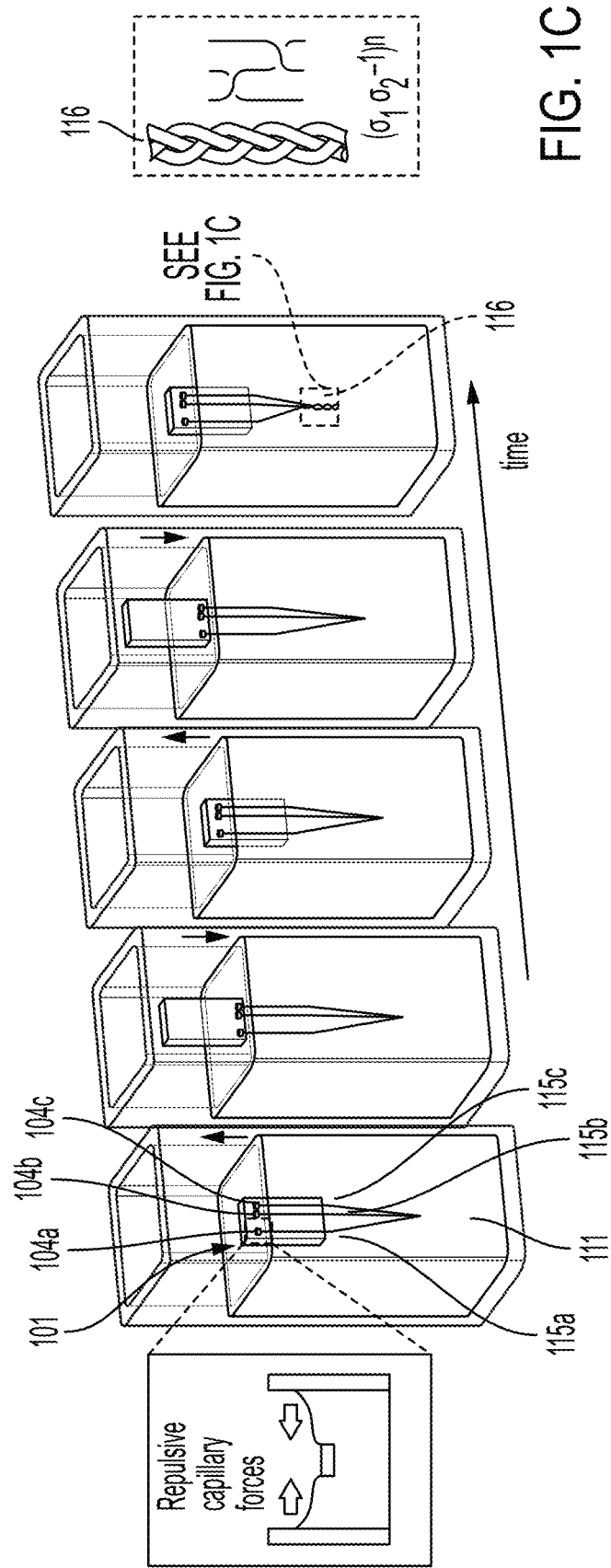

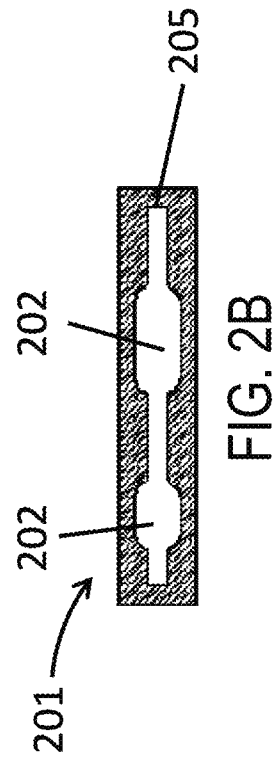
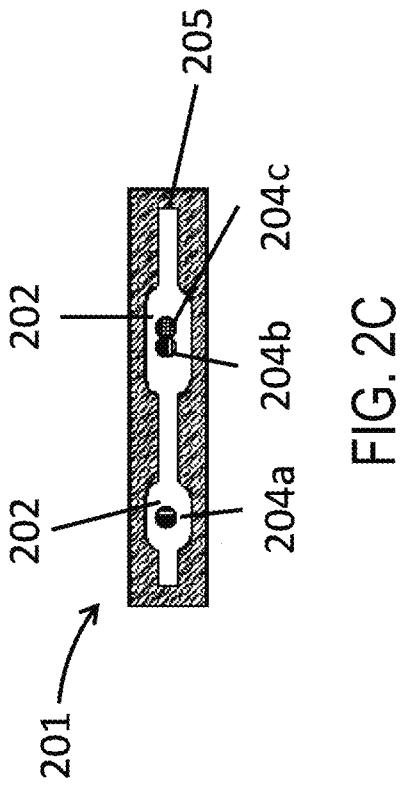
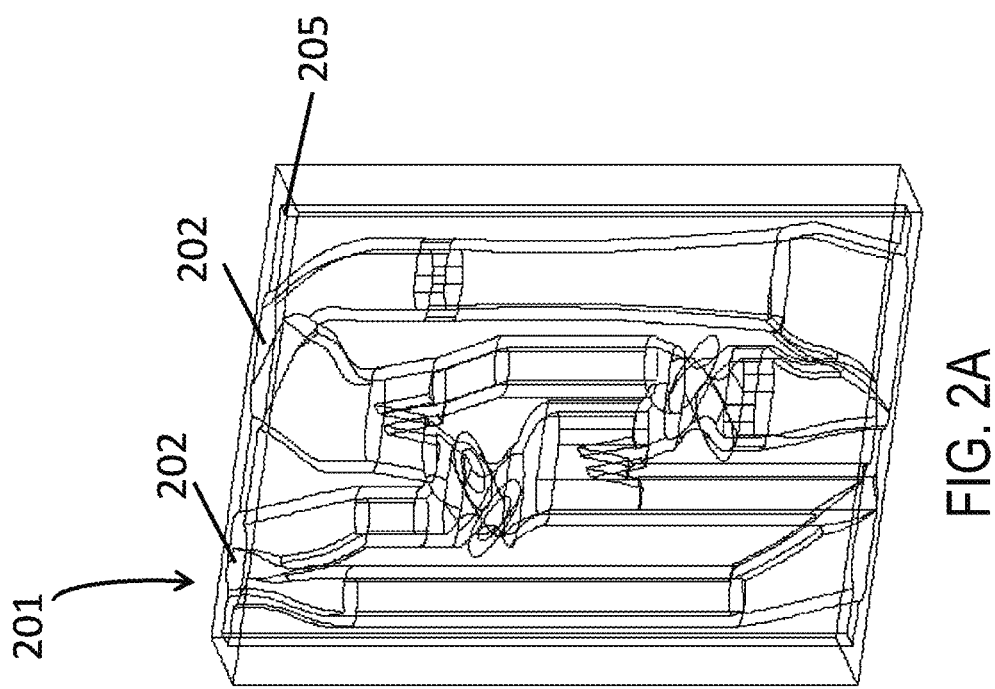

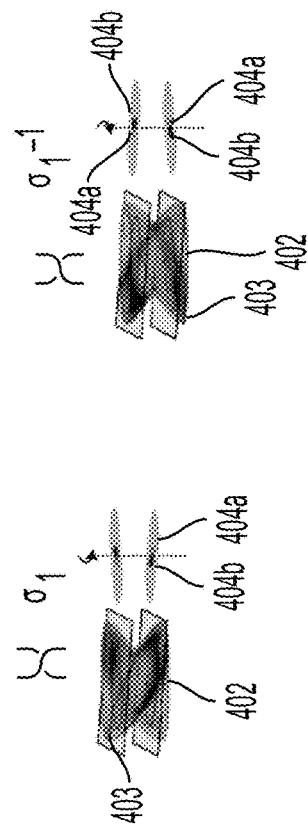
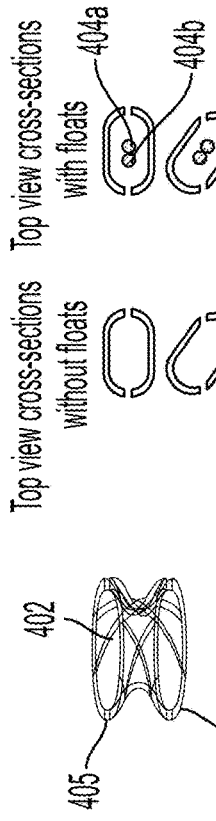
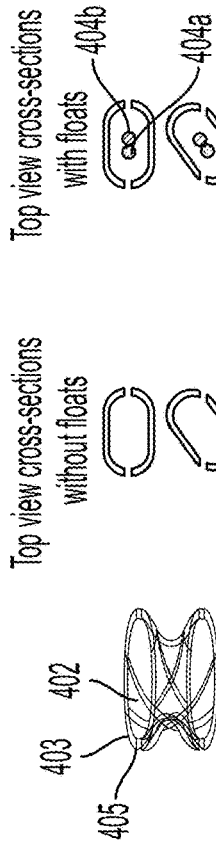
FIG. 4A — FIG. 4J

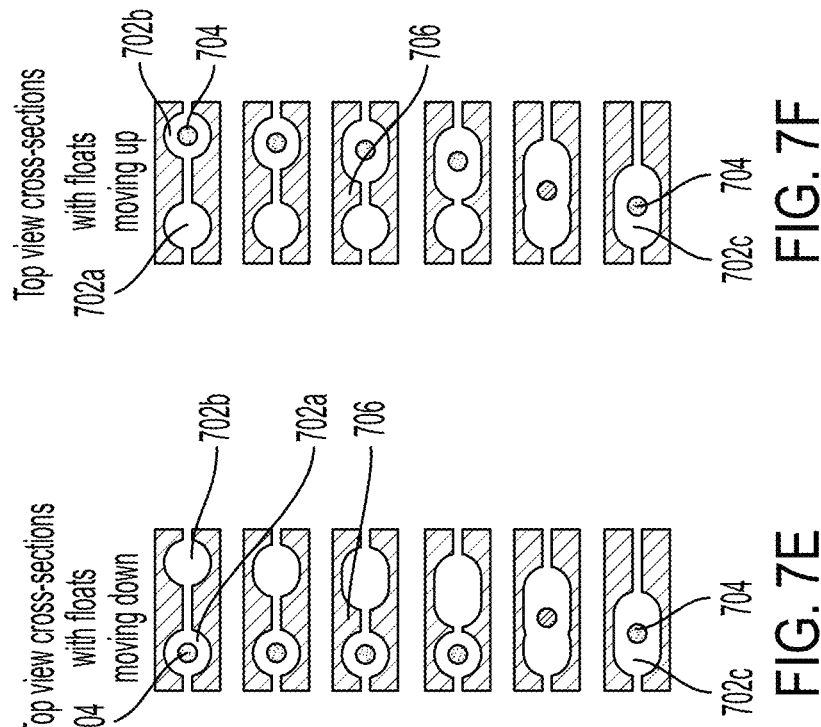
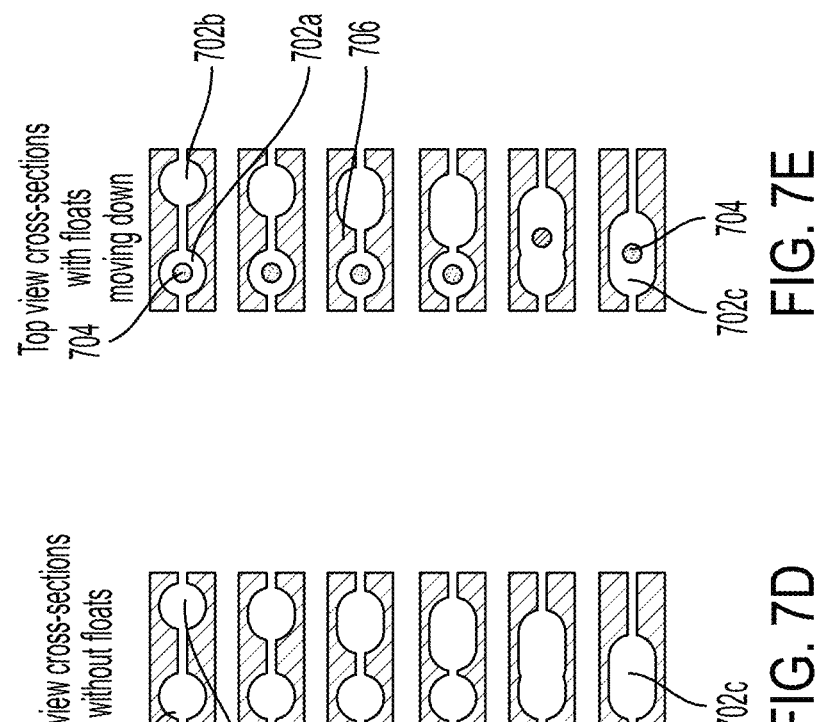
FIG. 7A
FIG. 7D
FIG. 7E
FIG. 7F
FIG. 7B
FIG. 7C

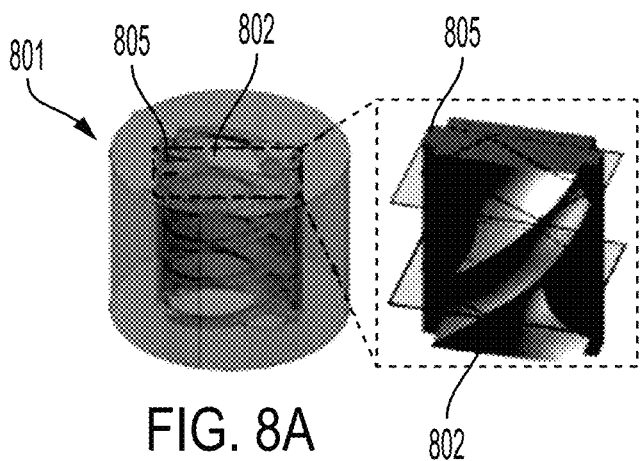
FIG. 8A
FIG. 8B
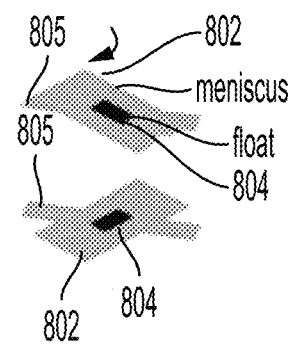
FIG. 8C
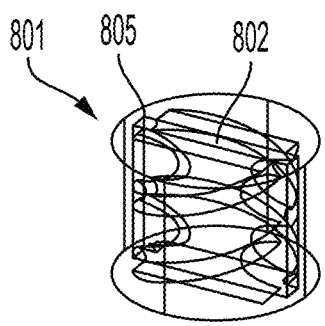
FIG. 8D
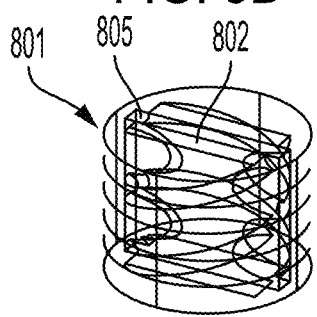
FIG. 8E
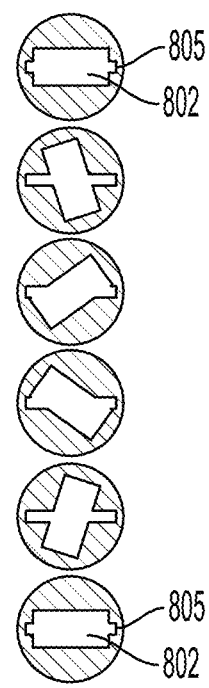
FIG. 8F

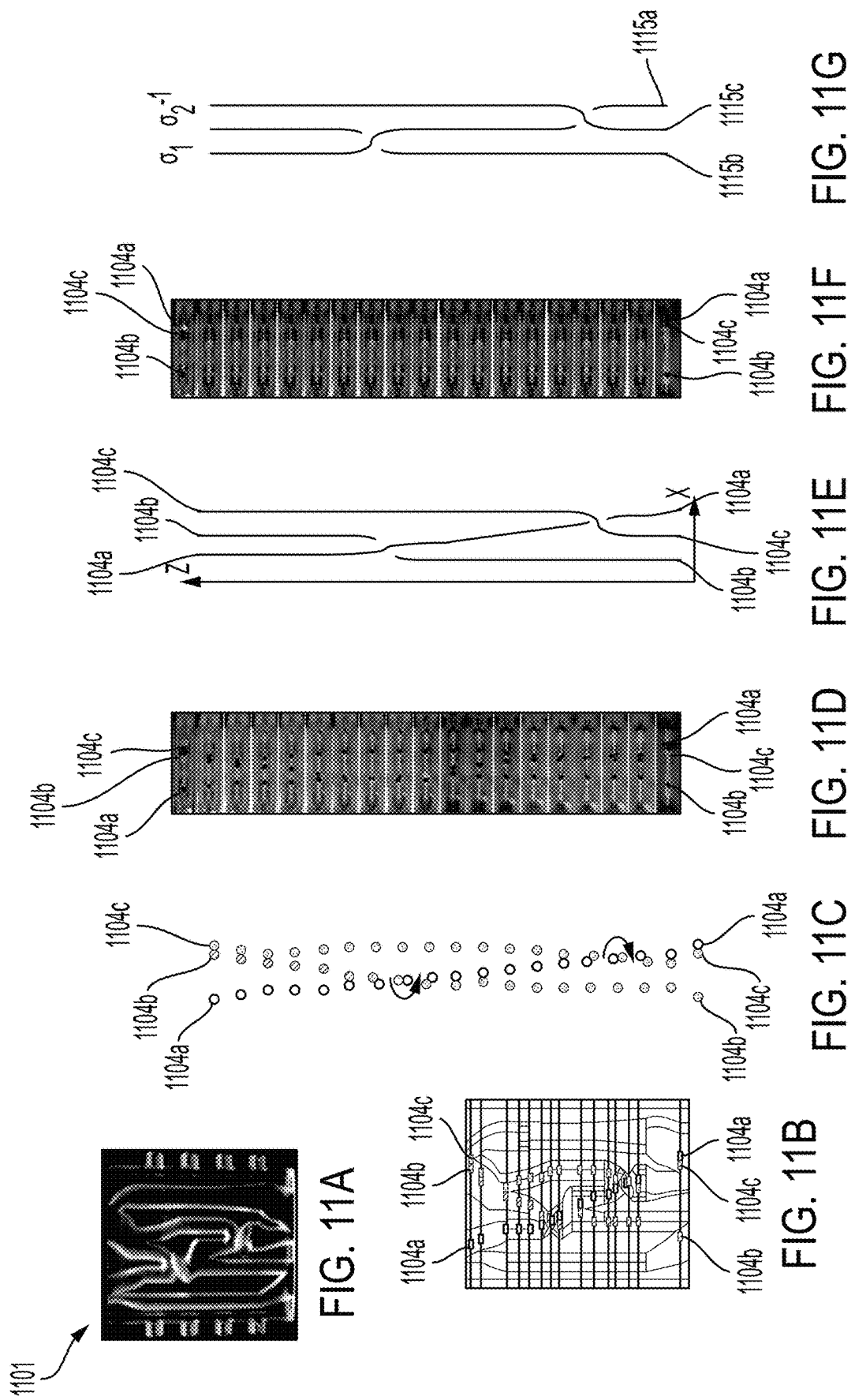

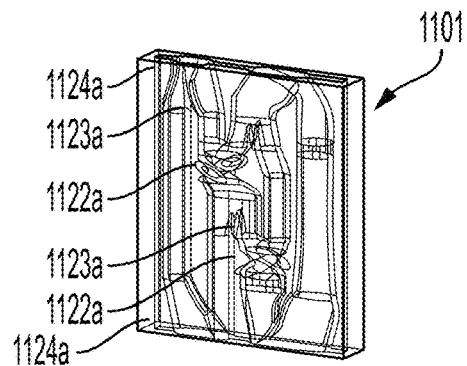
FIG. 11I
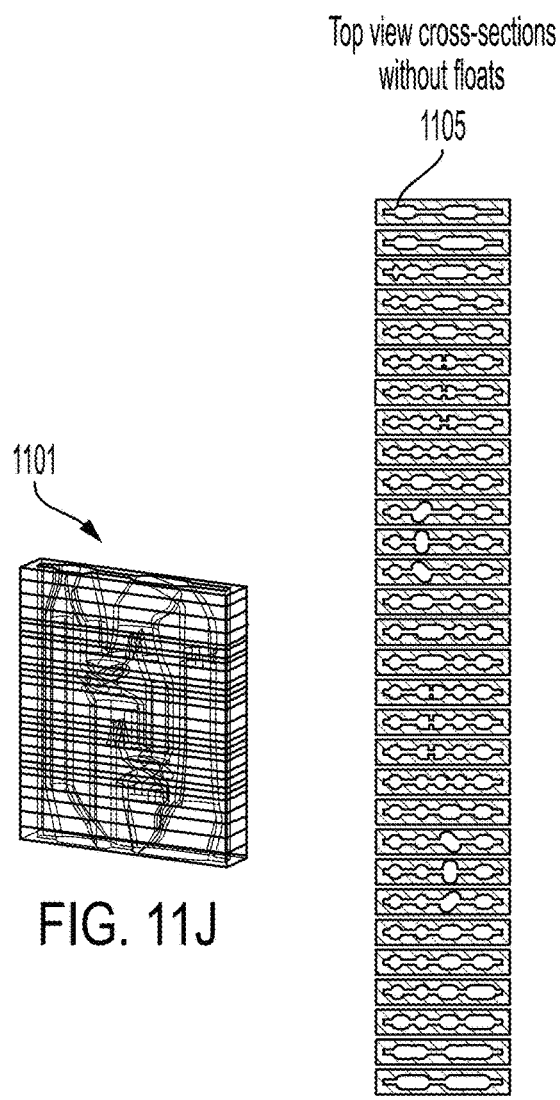
FIG. 11J
FIG. 11K
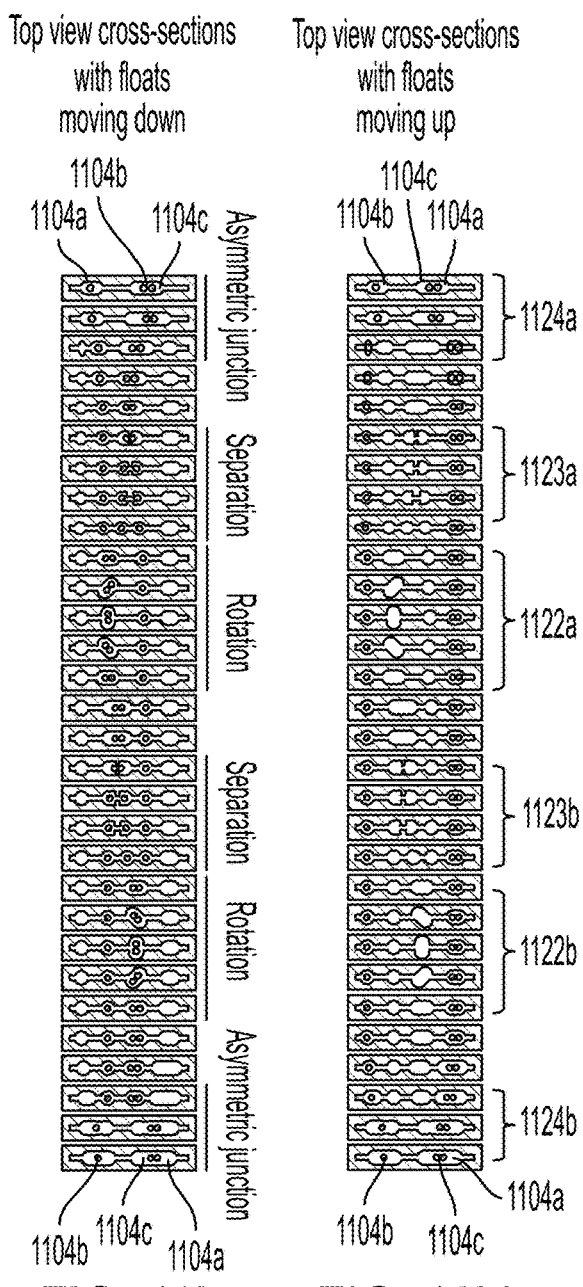
FIG. 11L   FIG. 11M

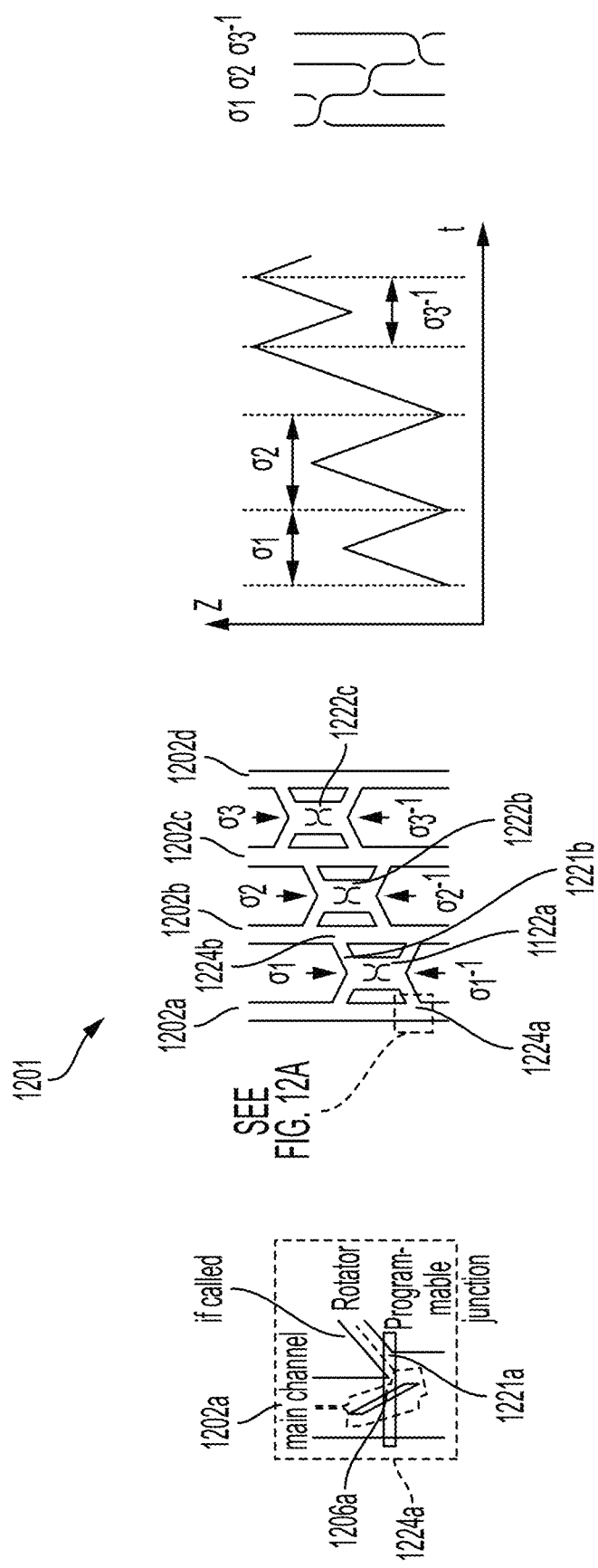

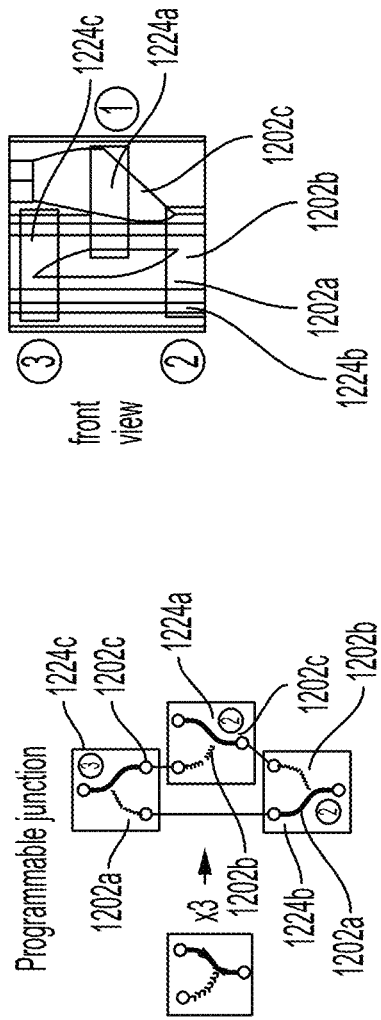
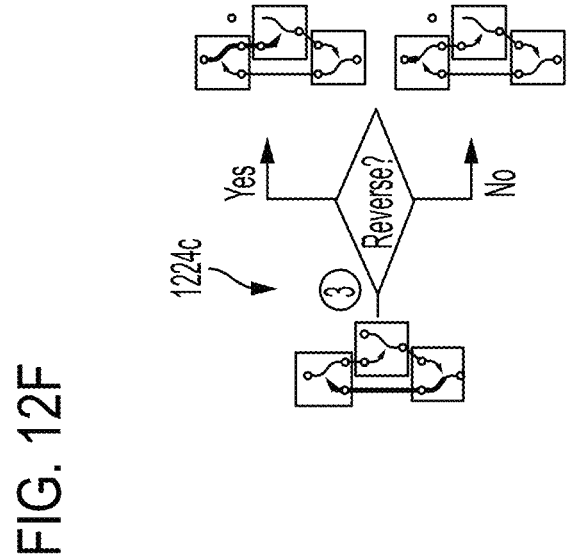
FIG. 12E
FIG. 12F
FIG. 12G
FIG. 12H
FIG. 12I

MANIPULATING AND ASSEMBLING MICRO- AND NANOSCALE OBJECTS WITH CAPILLARY FORCES

RELATED APPLICATIONS

This application is a Continuation application of U.S. patent application Ser. No. 17/639,088, filed Feb. 28, 2022, which is a National Phase Entry application of International Application No. PCT/US2020/048596, filed on Aug. 28, 2020, which claims the benefit of U.S. Provisional Application No. 62/894,042, filed Aug. 30, 2019, the contents of which are incorporated by reference in their entireties.

STATEMENT OF GOVERNMENT INTEREST

This invention was made with government support under FA8650-15-C-7543 awarded by U.S. Department of Defense/Defense Advanced Research Projects Agency (DOD/DARPA). The government has certain rights in this invention.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

FIELD OF THE INVENTION

The instant application relates to devices and methods for forming and manipulating micro- and nanostructures. In particular, the instant application relates to devices and method for forming a nanostructure made of microscopic or even nanoscopic wires or fibers.

BACKGROUND OF THE TECHNOLOGY

Braids can enhance the material properties of fibers. In mechanical braids such as rope, stress is distributed among the component filaments, enhancing the strength and fatigue behavior. In electrical braids such as a Litz wire, current is distributed among the filaments, enhancing the conductivity. Much of the same physics holds for micrometer- and even nano-scale fibers. However, all the above-mentioned microscale or nanoscale braids are limited to twists or supercoiled twists.

To date, simple, programmable, scalable, and cost-effective methods to manipulate and assemble small objects such as arbitrary braids of delicate micro- or nanoscale fibers do not exist. Mechanical approaches that are widely used in industry to fabricate complex braids are unsuitable for this purpose because each machine is not programmable and can make only a limited number of topologies, and these machines work with fibers or wires that are typically 100 micrometers in diameter or larger. These machines apply forces that would break smaller fibers, making them non-scalable.

SUMMARY

In some aspects, a device comprises a plurality of walls defining a slot and one or more channels wherein the one or more channels are intersected by the slot; wherein the one or more channels have a cross-section in a plane perpendicular to a vertical axis of the device that changes along the vertical axis; and one or more floats sized to allow movement of the one or more floats within said one or more channels, wherein the one or more floats have a surface characteristic that is different from the surface characteristic of the walls such that, upon contact with a fluid, said walls and said floats form different contact angles and induce a repulsive capillary force between the walls and the one or more floats at a surface of the fluid; and wherein the slot has a width that is smaller than the width of the one or more channels such that the one or more floats are prevented from moving between the one or more channels.

In some embodiments, at least one of the one or more channels is configured to move the one or more floats in the plane perpendicular to the vertical axis when the device moves from a first position and a second position along the vertical axis and translates within the plane perpendicular to the vertical axis between the first position and the second position.

In some embodiments, at least one of the one or more channels is configured to rotate two adjacent floats between a first position and a second position and comprises an elongated channel with a long axis that rotates about the vertical axis between the first position and the second position.

In some embodiments, at least one of the one or more channels is configured to move a first float from a wide channel a first position along the vertical axis to a first channel at a second position along the vertical axis and to move a second float from the wide channel to a second channel at the second position, and wherein at least one of the one or more channels comprises a divider between the first position and the second position.

In some embodiments, at least one of the one or more channels is configured to rotate at least one of the one or more floats about the vertical axis between a first position and a second position along the vertical axis and comprises an elongated channel with a long axis that rotates about the vertical axis between the first position and the second position.

In some embodiments, the one or more channels are configured to return the one or more floats to a first position from a second position along the vertical axis and at least one of the one or more channels is configured to steer the one or more floats to a wide channel such that the one or more floats return to the first position through the wide channel.

In some embodiments, the one or more channels are configured to return the one or more floats to a first position from a second position along the vertical axis, and wherein the first contact angle has a first value when the device moves from the first position to the second position and a second value when the device moves from second position to the first position, and wherein the one or more floats rotate when the device moves from the first position to the second position, but the one or more floats do not rotate when the device moves from the second position to the first position.

In some embodiments, the device comprises one or more rotators configured to rotate two adjacent floats located between the one or more vertical channels; wherein each rotator configured to rotate two adjacent floats is at a different position along the vertical axis of the device and connected to the adjacent vertical channels via a diagonal channel; and wherein each vertical channel comprises a divider at the position of each rotator.

In some embodiments, the walls comprise surface features arranged at distinct points along the vertical axis.

In some embodiments, the surface features are arranged in a spiral about the vertical axis.

In some embodiments, the surface features have a size of 1-10 μm, 10-20 μm, 20-30 μm, 30-40 μm, 40-50 μm, 50-60 μm, 70-80 μm, 80-90 μm, 90-100 μm, 100-150 μm, 150-200 μm, 200-250 μm, 250-300 μm, 350-500 μm, 500-550 μm, 550-600 μm, 650-700 μm, 750-800 μm, 850-900 μm, 950-1000 μm, 1000-1500 μm, 1500-2000 μm, 2000-2500 μm, 2500-3000 μm, 3000-3500 μm, 3500-4000 μm, 4500-5000 μm, 4500-5000 μm, 5000-6000 μm, 6000-7000 μm, 7000-8000 μm, 8000-9000 μm, and 9000-10000 μm.

In some embodiments, the microstructures are circular, triangular, or trapezoidal.

In some embodiments, upon contact with a fluid, said walls and said floats form different contact angles such that the contact angle of the walls is greater than 90°, and the contact angle of the one or more floats is less than 90°.

In some embodiments, upon contact with a fluid, said walls and said floats form different contact angles such that the contact angle of the walls is less than 90°, and the contact angle of the one or more floats is greater than 90°.

In some embodiments, the walls are hydrophilic, and the one or more floats are hydrophobic.

In some embodiments, the walls are hydrophobic, and the one or more floats are hydrophilic.

In some embodiments, the device comprises a material selected from the group consisting of glass, steel, aluminum, titanium, 3D-printed polymer, polydimethylsiloxane, polypropylene, polyvinyl chloride, polystyrene, nylon, polytetrafluoroethylene (Teflon), acrylates, polymethylmethacrylate, thermoplastic polyurethanes, and combinations thereof.

In some embodiments, the walls of the device are treated with a surface treatment selected from the group consisting of plasma-treatment, hydroxyl groups, amine groups, fluorinated silanes, fluoropolymers, oils, wax, nanopatterning, micropatterning, nanostructures, microstructures, particle deposition, vapor deposition, sol-gel treatment, and combinations thereof.

In some embodiments, the walls of the device have a roughened surface.

In some embodiments, the one or more floats comprise a material selected from the group consisting of glass, steel, aluminum, titanium, 3D-printed polymer, polydimethylsiloxane, hydroxyl groups, amine groups, fluorinated silanes, fluoropolymers, oils, wax, nanopatterning, micropatterning, nanostructures, microstructures, particle deposition, vapor deposition, sol-gel treatment, and combinations thereof.

In some embodiments, the one or more floats are treated with a surface treatment selected from the group consisting of plasma-treatment, hydroxyl groups, amine groups, fluorinated silanes, fluoropolymers, oils, wax, nanopatterning, micropatterning, nanostructures, microstructures, particle deposition, vapor deposition, sol-gel treatment, and combinations thereof.

In some embodiments, the one or more floats have a roughened surface.

Ins some embodiments, the device further comprises an attractive force between the one or more floats.

In some embodiments, the one or more floats have a shape selected from the group consisting of circles, ovals, convex polygons, non-convex polygons, rounded polygons, and combinations thereof.

In some embodiments, the one or more floats have a shape selected from the group consisting of triangles, rectangles, squares, pentagons, hexagons, octagons, isotaxal stars, and combinations thereof In some embodiments, the one or more channels have a shape selected from the group consisting of circles, ovals, convex polygons, non-convex polygons, rounded polygons, and combinations thereof.

In some embodiments, the one or more channels have a shape selected from the group consisting of triangles, rectangles, squares, pentagons, hexagons, octagons, isotaxal stars, and combinations thereof.

In some embodiments, each of the one or more floats is capable of receiving a wire.

In some embodiments, each of the one or more floats is configured to be secured to a wire.

In some embodiments, each of the one or more floats is configured to be secured to a plurality of wires.

In some embodiments, the fluid is water, an aqueous solution, oil, a non-polar solvent, an organic solvent, or mercury.

In one aspect, a method of forming a braid, comprises placing a fluid in the device of any one of the preceding claims; and securing one or more wires to each of one or more floats; moving the device along a vertical axis of the device such that the one or more floats at a surface of the fluid move across the surface when the devices moves along the vertical axis with respect to the fluid.

In some embodiments, moving the device comprises moving one of the one or more floats through a channel configured to move the one or more floats in the plane perpendicular to the vertical axis; and steering at least one of the one or more floats within the channel.

In some embodiments, moving the device comprises moving a first float and a second float through an elongated channel configured to rotate the first float and the second float between a first position and a second position, wherein the one elongated channel has a long axis that rotates about the vertical axis between the first position and the second position along the vertical axis; steering a first float at a first end of the elongated channel and a second float at a second end of the elongated channel along as the elongated channel rotates; and rotating the first float and the second float.

In some embodiments, moving the device further comprises moving a first float and a second float through one or more channels configured to move the first float from a wide channel a first position along the vertical axis to a first channel at a second position along the vertical axis and to move the second float from the wide channel to a second channel at the second position; and steering a first float in the wide channel to the first channel and steering a second float in the wide channel to the second channel; wherein the one or more channels comprises a divider.

In some embodiments, moving the device further comprises moving one or more floats through an elongated channel configured to rotate at least one of the one or more floats about the vertical axis between a first position and a second position along the vertical axis, wherein the elongated channel has a long axis that rotates about the vertical axis between the first position and the second position along the vertical axis; and rotating at least one of the one or more floats about the vertical axis, wherein the one or more floats is secured to a plurality of wires.

In some embodiments, the method further comprises moving the device in from a first position to a second position along the vertical axis and returning to the first position via one or more channels configured to return the one or more floats to a first position from a second position along the vertical axis.

In some embodiments, the method further comprises steering one or more floats to a wide channel at a second position to return to the first position through the wide channel.

In some embodiments, the one or more channels is configured such that the first contact angle has a first value when the device moves from the first position to the second position and a second value when the device moves from second position to the first position, and the one or more floats rotate when the device moves from the first position to the second position, but do not rotate when the device moves from the second position to the first position.

In some embodiments, the method further comprises moving the device from the first position to the second position and returning to the first position via one or more channels configured to return the one or more floats to the first position from the second position along the vertical axis; and forming a braid with a periodic structure.

In some embodiments, a method of forming a braid, comprises placing a fluid in the device, floating a float within each of the one or more vertical channels; securing one or more wires to each of one or more floats; moving the device up and down the vertical axis of the device; reversing the direction of the device to steer a first float in a first vertical channel and a second float in a second vertical channel into a rotator configured to rotate the first float and the second float and located between the first vertical channel and the second vertical channel; rotating the first float and the adjacent within the plane perpendicular to the vertical axis float; and steering the first float into the second vertical channel and the second float into the first vertical channel.

In some embodiments, rotating the first adjacent float and the second adjacent float further comprises steering the first adjacent float from a first main channel to a rotator between the first main channel and the second main channel using a first asymmetric junction; steering the second adjacent float from a second main channel to the rotator between the first main channel and the second main channel using a second asymmetric junction; moving device vertically through the rotator between the first main channel and the second main channel; steering the first adjacent float from the rotator to the second main channel after rotating; and steering the second adjacent float from the rotator to the first main channel after rotating.

In some embodiments, the method further comprises programming the device to move up and down the vertical axis in a predetermined manner.

In some embodiments, the method of making the device comprises forming the one or more channels and the slot within a solid material; and forming the one more floats.

In some embodiments, forming the one or more channels comprises a method selected from the group consisting of additive manufacturing, molding, 3-D printing, casting, blowing, extrusion, and machining.

In some embodiments, the method further comprises treating the surface of the walls.

In some embodiments, the method further comprises treating the surface of the one or more floats.

BRIEF DESCRIPTION OF THE DRAWINGS

The objects and advantages will be apparent upon consideration of the following detailed description, taken in conjunction with the accompanying drawings, in which like reference characters refer to like parts throughout, and in which:

FIG. 1B illustrates the movement of floats with secured wires as a device moves vertically relative to the surface of a fluid, in accordance with certain embodiments.

FIG. 1C illustrates a three-strand braid formed by the movement of the device in FIG. 1B, in accordance with certain embodiments.

FIG. 2A illustrates a three-dimensional rendering of a device in accordance with certain embodiments FIG. 2B illustrates a cross-section of a device in accordance with certain embodiments.

FIG. 2C illustrates a cross-section of a device with floats located in the channels of the device in accordance with certain embodiments.

FIG. 4A illustrates rotator that rotates floats counter-clockwise when moving floats from top to bottom in accordance with certain embodiments.

FIG. 4B illustrates a rotator that rotates floats clockwise when moving floats from top to bottom in accordance with certain embodiments.

FIG. 4C illustrates a three-dimensional rendering of a rotator that rotates floats counter-clockwise when moving floats from top to bottom, in accordance with certain embodiments.

FIG. 4D illustrates locations of cross-sections of a rotator that rotates floats counter-clockwise when moving floats from top to bottom, in accordance with certain embodiments.

FIG. 4E illustrates cross-sections of a rotator that rotates floats counter-clockwise when moving floats from top to bottom, in accordance with certain embodiments.

FIG. 4F illustrates cross-sections of a rotator that rotates floats counter-clockwise when moving floats from top to bottom and the counter-clockwise movement of floats in the channel, in accordance with certain embodiments with floats.

FIG. 4G illustrates a three-dimensional rendering of a rotator that rotates floats clockwise when moving floats from top to bottom, in accordance with certain embodiments.

FIG. 4H illustrates locations of cross-sections of a rotator that rotates floats clockwise when moving floats from top to bottom, in accordance with certain embodiments.

FIG. 4I illustrates cross-sections of a rotator that rotates floats clockwise when moving floats from top to bottom, in accordance with certain embodiments.

FIG. 4J illustrates cross-sections of a rotator that rotates floats clockwise when moving floats from top to bottom with floats located in the channels, in accordance with certain embodiments.

FIG. 7A illustrates a side view of an asymmetric junction in accordance with certain embodiments.

FIG. 7B illustrates a three-dimensional rendering of an asymmetric junction, in accordance with certain embodiments.

FIG. 7C illustrates locations of cross-sections of an asymmetric junction, in accordance with certain embodiments.

FIG. 7D illustrates cross-sections of an asymmetric junction, in accordance with certain embodiments.

FIG. 7E illustrates cross-sections of an asymmetric junction and movement of floats as the device moves down the asymmetric junction, in accordance with certain embodiments.

FIG. 7F illustrates cross-sections of an asymmetric junction and movement of floats as the device moves up the asymmetric junction, in accordance with certain embodiments.

FIG. 8A illustrates a twisting ratchet for a twist that allows a float to move down without untwisting a braid.

FIG. 8B illustrates a rendering of the shape of a channel in a twisting ratchet for a twist when the device moves up and down FIG. 8C illustrates cross-sections of a twisting ratchet for a twist and movement of a float as the device moves up and down, in accordance with certain embodiments.

FIG. 8D illustrates a three-dimensional rendering of a twisting ratchet, in accordance with certain embodiments.

FIG. 8E illustrates a location of cross-sections of a twisting ratchet, in accordance with certain embodiments.

FIG. 8F illustrates cross-sections of a twisting ratchet, in accordance with certain embodiments.

FIG. 11A is a photograph of device for forming a three-strand braid, in accordance with certain embodiments.

FIG. 11B illustrates a side view of device for forming a three-strand braid showing locations of cross-sections and floats, in accordance with certain embodiments.

FIG. 11C illustrates the switching of the floats within the channels, in accordance with certain embodiments.

FIG. 11D is a photograph of cross-sections of the device showing movement of the floats as the device moves down, in accordance with certain embodiments.

FIG. 11E illustrates the locations of the floats in the x-axis as they move vertically through the device.

FIG. 11F is a photograph of cross-sections of the device showing movement of the floats as the device moves up after steering the floats via an asymmetric junction, in accordance with certain embodiments.

FIG. 11G illustrates the braid group formed by the three-strand braiding device.

FIG. 11I illustrates a three-dimensional rendering of a three-strand braiding device, in accordance with certain embodiments.

FIG. 11J illustrates locations of cross-sections of a three-strand braiding device, in accordance with certain embodiments.

FIG. 11K illustrates cross-sections of a three-strand braiding device, in accordance with certain embodiments.

FIG. 11L illustrates cross-sections of a three-strand braiding device and movement of floats as the device moves up and the floats move down, in accordance with certain embodiments.

FIG. 11M illustrates cross-sections of a three-strand braiding device and movement of floats as the device moves down and the floats move up the asymmetric junction, in accordance with certain embodiments.

FIG. 12A illustrates a programmable junction to move a float into a rotator of a programmable braiding device, in accordance with certain embodiments.

FIG. 12B illustrates a side view of a programmable braiding device with rotators located at different heights, in accordance with certain embodiments.

FIG. 12C illustrates a trajectory that forms a fishtail braid, in accordance to certain embodiments.

FIG. 12D is a schematic of a fishtail braid, in accordance to certain embodiments.

FIG. 12E is a schematic of a programmable junction with three asymmetric junctions, in accordance with certain embodiments.

FIG. 12F illustrates the locations of three asymmetric junctions on a programmable junction, in accordance with certain embodiments.

FIG. 12G illustrates the movement of floats at the first asymmetric junction, in accordance with certain embodiments.

FIG. 12H illustrates the movement of floats at the second asymmetric junction, in accordance with certain embodiments.

FIG. 12I illustrates the movement of floats at the third asymmetric junction, in accordance with certain embodiments.

DETAILED DESCRIPTION

Figure 1A:
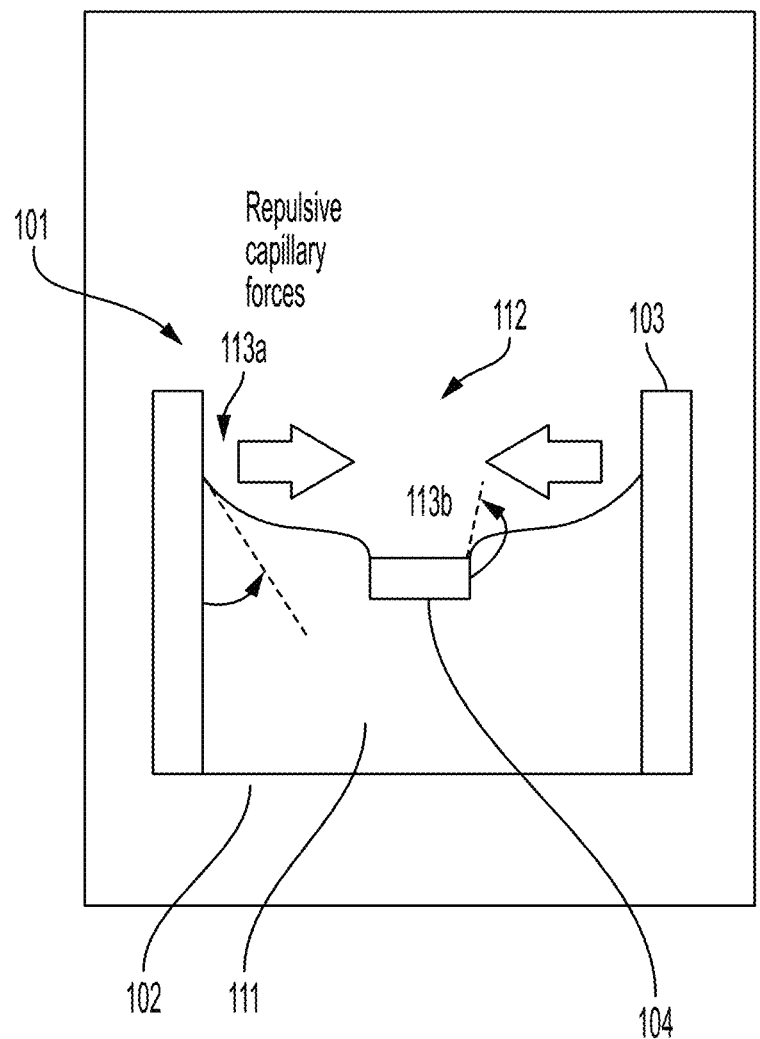
FIG. 1A illustrates the repulsive capillary forces acting on a float in a channel filled with a fluid, in accordance with certain embodiments.

In one aspect, a method for manipulating or forming nanostructures or microstructures using capillary forces is described. In one embodiment, a method for braiding microscale or even nanoscale wires into arbitrary topologies is described. This method takes advantage of repulsive capillary forces to effectively trap and move floats at an air/fluid interface inside channels of a device. This method uses one degree of freedom, e.g., movement of a device up or down with respect to the air/fluid interface, to move floats with respect to one another in complex patterns within the plane of the air/fluid interface. To use the floats to manipulate other objects, wires or needles can be used to secure them to the floats while the device is filled with fluid. The inner surfaces of the device are shaped so that as the fluid level changes, the cross-section of the device changes, and the repulsive capillary forces on the floats change, causing them to translate or rotate in a sequence to form the desired structure. In some embodiments, the repulsive capillary forces on the floats cause the floats to move or rotate in a sequence.

Furthermore, macroscopic floats and devices can manipulate microscale or even nanoscale structures or wires because the range of the capillary forces is large enough (millimeter to centimeter scale) to move the floats. Because capillary forces are scalable, these forces can be made small enough that they do not break even very thin wires with diameters in the micro- or even nanoscale. In some embodiments, a decimeter scale device moves a millimeter-scale float. In one embodiment, a simple device is disclosed to make a braid, wherein the braid topology is programmed into the structure of the device itself. As the device moves relative to the air/fluid interface, each float moves along a set path, moving as far away from the walls of the device as possible because of repulsive capillary forces. The shape of the walls therefore determines the path, and thus the braid structure. In some embodiments, programming float motions into the device allows fabrication of complex braids from fragile fibers with only one moving part: a stage that raises or lowers the device. In some embodiments, a device includes programmable junctions, and the path of floats is determined by the movement of the device relative to water.

In some embodiments, the movement of the device is described in terms of movement of the channels of the device relative to the surface of the fluid or in terms of the movement of the floats at the surface of the fluid relative to the channels of the device. The floats are located at the surface of the fluid, i.e. at the interface between fluid and air. As the channels of a device move up relative to the surface of the fluid, the floats move down relative to the channels of the device. As the channels of a device move down relative to the surface of the fluid, the floats move up relative to the channels of the device. In some embodiments, this movement is accomplished by moving a device into and out of a fluid. This movement can be accomplished, for example, by a mechanical stage. In other embodiments, this movement can be accomplished by holding the device fixed and raising or lowering the level of the fluid.

In one aspect, shown in FIG. 1A, the device 101 includes a channel 102 and a float 104. When the device is placed in a fluid 111, the walls 103 of the channels 102 form a contact angle 113a relative to the fluid 111 at the interface between fluid 111 and air 112. When a float 104 is placed at the surface of the fluid 111, at the air/fluid interface, the float 104 forms a contact angle 113b relative to the fluid 111. In some embodiments, the contact angle of the walls 113a and the contact angle of the float 113b is different. For example, if the walls and the float have opposite contact angles, i.e., one contact angle is less than 900 and the other contact angle is greater than 90°, then the device can induce repulsive capillary forces between the walls 103 and the float 104. In some embodiments, the shape of the channel 102 changes, and the shape of the meniscus at the air/fluid interface changes. As the shape of the meniscus changes, the repulsive forces change, causing the floats 104 move within the channel 102. In some embodiments, motion of the float is driven by the minimization of interfacial energy rather than the fluid flow through the channels As shown in FIG. 1B, repulsive capillary forces in a device 101 can be used to create a braid 116 by securing each float 104a, 104b, 104c to a wire 115a, 115b, 115c. As the device 101 moves up and down relative to the fluid 111, the floats 104a, 104b, 104c move in a predetermined manner and the wires 115a, 115b, 115c move with the floats. By cycling up and down, the device 101 can form a braid 116 with a repeating pattern. FIG. 1C shows a three-strand braid formed by the movement of the device in FIG. 1B, in accordance with certain embodiments.

In some embodiments, for example, shown in FIGS. 2A-2C, the device 201 can be designed so that it is programmed to induce certain predetermined movements of the floats 204a, 204b, 204c. The device has one or more channels 202 intersected by a slot 205. The shape of the cross-section of the device 201 changes along the vertical axis of the device. As shown in FIG. 2B, in a cross-section of the device 201, the channels 202 are wider than the intersecting slot 205. FIG. 2C shows a cross-section of the device with floats 204a, 204b, 204c located in the channels 202. In some embodiments, the width of the slot 205 is selected such that when floats 204a, 204b, 204c are placed in the channels 202, the floats 204 cannot move into the slot 205 between two adjacent channels 202. In some embodiments, the floats 204 are larger than the width of the slot 205. In other embodiments, the floats 204 are prevented from entering the slots by repulsive forces. As a result, as the device 201 moves vertically, the floats 204 are moved within the channels 202 by repulsive forces. In some embodiments, the floats 204 are secured to wires, and the portions of the wires not being contained within the floats can move within the slot 205, allowing the device to form a braid as the floats 204a, 204b, 204c move.

In some embodiments the repulsive capillary forces have a magnitude on the order of nano-Newtons or micro-Newtons, depending on the fluid, float size, surface chemistry, and geometry. In some embodiments, the forces are 1-10 nN, 10-20 nN.

In some embodiments, the device is designed such that the contact angle of the walls and the contact angle of the float on contact with the fluid is different. For example, if the walls and the float have contact angles representing opposite wettabilities, i.e., one contact angle is less than 90° and the other contact angle is greater than 90°, then the device can induce repulsive capillary forces between the walls and the float. In some embodiments, the surface of the walls of the channels are hydrophilic and the surfaces of floats are hydrophobic. In other embodiments, the surface of the walls of the channels are hydrophobic and the surfaces of floats are hydrophilic. In some embodiments, the contact angles of the walls and the floats can be tuned, for example, based on selection of the materials used to form the walls and the floats. In other embodiments, the contact angles of the walls and floats can be tuned by treating the surface one or more of the walls or the floats. In some embodiments, the walls or floats can be treated with chemical groups that are hydrophilic or hydrophobic. In other embodiments, the contact angles of the walls or floats can be tuned by introducing surface roughness. In other embodiments, the contact angle of the floats can be tuned by adding vertical forces. In some embodiments, the float is heavier than the fluid but pins the interface at its boundary, resulting in an interface that curves downward toward the float. As a result, the float is repelled from the wall.

In some embodiments, the channels can be formed in a device made of glass, metal, polymers and combinations thereof. Non-limiting embodiments of metals include steel, aluminum, titanium, and combinations thereof. Non-limiting examples of polymers include polydimethylsiloxane (PDMS), polyethylene, polypropylene, polyvinyl chloride, polystyrene, nylon, polytetrafluoroethylene (Teflon), acrylates, polymethylmethacrylate, thermoplastic polyurethanes, and combinations thereof. In some embodiments, the channels are formed from a nonporous material.

In some embodiments, the floats can be formed in a device made of glass. In some embodiments, the floats can be formed in a device made of glass, metals, polymers, and combinations thereof. Non-limiting embodiments of metals include steel, aluminum, titanium, and combinations thereof. Non-limiting examples of polymers include polydimethylsiloxane (PDMS), polyethylene, polypropylene, polyvinyl chloride, polystyrene, nylon, polytetrafluoroethylene (Teflon), fluoropolymers, acrylates, polymethylmethacrylate, thermoplastic polyurethanes, and combinations thereof. In some embodiments, the floats are formed from a nonporous material. In some embodiments, the floats are droplets or bubbles that can sit along the interface.

In some embodiments, the hydrophobic treatment includes treatment with fluorinated silanes, fluoropolymers, oils, wax, nanopatterning, micropatterning, nano- or microstructures, particle deposition, vapor deposition, sol-gel treatment, and combinations thereof.

In some embodiments, the hydrophilic treatment includes treatment with plasma, hydroxyl groups, amine groups, nanopatterning, micropatterning, nanostructures, microstructures, particle deposition, vapor deposition, sol-gel treatment, and combinations thereof.

In some embodiments surface roughness includes porosity, nano-patterned topography, micro-patterned topography, particle deposition, and combinations thereof.

In some embodiments, channels have a cross-section with one or more of the following shapes: circles, ovals, convex polygons, and non-convex polygons. Non-limiting examples of convex polygons include triangles, rectangles, squares, pentagons, hexagons, octagons, and combinations thereof. Non-limiting examples of non-convex polygons include isotoxal stars. In some embodiments the corners of the polygons are rounded. In some embodiments, the cross-section of the channel includes micropatterning.

In some embodiments, the floats have one or more of the following shapes: circles, ovals, convex polygons, and non-convex polygons. Non-limiting examples of convex polygons include triangles, rectangles, squares, and combinations thereof. Non-limiting examples of non-convex polygons include isotoxal stars. In some embodiments the corners of the polygons are rounded. In some embodiments the floats are flat. In other embodiments, the floats include structures above the water. In some embodiments the floats include structures below the water. In some embodiment the floats include structures above and below the water.

In other embodiments, a vertical force can be applied to the floats, for example by adding weight to the float (i.e., increasing the gravitational force) or by applying tension to a wire secured to the float.

In some embodiments there is an attractive capillary force between the floats. This attractive force can be used, for example, to bring two floats together in a rotator. However, the attractive force should not be so great that two floats stick together and cannot be separated in a separator. The floats interact along their edges. For example, if two floats have long edges, there will be a large interface along which two floats can interact. If, instead it is desired to reduce the attractive force between floats, the floats can be circular. Two circular floats can interact only at one point, reducing the attractive forces between the floats.

In some embodiments, each float is configured to be secured to one or more nano- or microscale structures. In some embodiments, each float is configured to be secured to a single wire. In some embodiments, a float is configured to secure to a plurality of wires. In some embodiments, the wires can be secured to the floats via an adhesive, a needle, or solder. In some embodiments, the floats include an integrated or built-in needle with a head to which a wire can be secured. In some embodiments, needles are long enough for their tips to clear the bottom of the device. In some embodiments, the needles can be attached to even smaller objects, linking the motion of these smaller objects to the motion of the floats at the interface. In some embodiments, the float includes a slice, hole, or slot through which a wire can be threaded and secured. In some embodiments, the wire is embedded or cured within the material of the float.

In some embodiments, the wire is a conductor, a synthetic fiber, or a natural polymer fiber. Non-limiting examples of conductors include nanowires, silicon, germanium, gold, silver, platinum, copper, and carbon. Non-limiting examples of synthetic fibers include Kevlar, nylon, polyester, Dacron, and acrylic. Non-limiting examples of natural polymer fibers include silk, wool, cellulose, collagen, polypeptides, and polynucleotides. In some embodiments, the wires are electrospun filaments.

In some embodiments, the fluid is water or an aqueous solvent. In some embodiments, the fluid is an oil or a non-polar solvent. In some embodiments, the fluid is an organic solvent. In some embodiments, the fluid is mercury. In some embodiments, the surface tension is 20 mN/m or greater.

In some embodiments, the device can be formed by additive manufacturing, molding, 3-D printing, casting, blowing, extrusion, or machining.

In some embodiments, the floats can be formed by additive manufacturing, molding, punching, 3D-printing, casting, casting, blowing, photolithography, or machining.

In some embodiments, the channels of the device can be designed to perform various operations to move the floats to form braids. In some embodiments, the channels of the device can be designed to perform various operations to move the floats to form braids or other structures. These operations include translating, rotating, separating, ratcheting, and twisting. A segment of a channel may be designed as a zone to perform one of these operations. For example, the device may have one or more of a translator, a rotator, a separator, and an asymmetric junction. These zones can be combined in sequence to form a braid with a desired pattern. In some embodiments, the device is designed to have a sequence of operations that is programmed to form a specific braid, twist, or other structure.

Translator

Figure 3A:
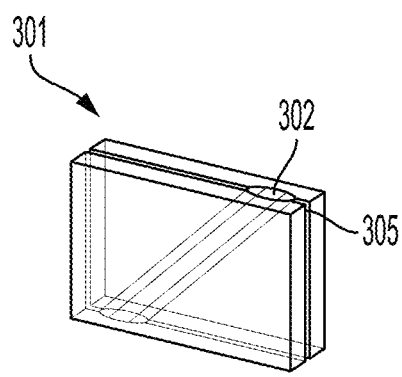
FIG. 3A illustrates a three-dimensional rendering of a translator of a device, in accordance with certain embodiments.
Figure 3B:
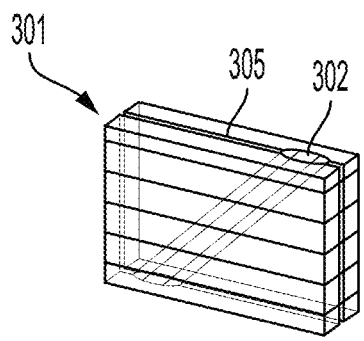
FIG. 3B illustrates locations of cross-sections of a translator of a device, in accordance with certain embodiments.
Figure 3C:
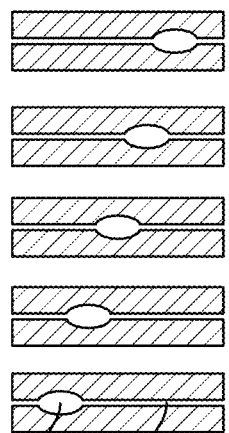
FIG. 3C illustrates cross-sections of a translator of a device in accordance with certain embodiments.
Figure 3D:
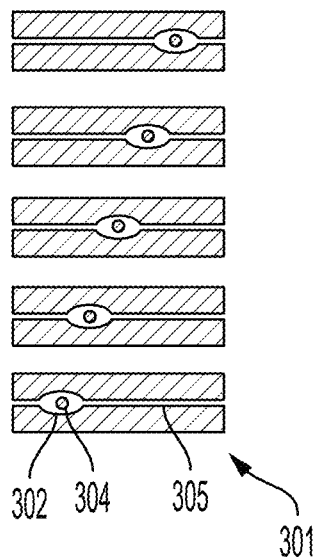
FIG. 3D illustrates cross-sections of a translator of a device and the movement of floats in the channel, in accordance with certain embodiments.

In certain embodiments, the device can be provided with one or more translators or translating zones that allows the movement of the one or more floats within a plane perpendicular to the vertical axis of the device. In some embodiments, a translator is a channel oriented at an angle to the interface. In one embodiment, shown in FIGS. 3A-3D, a translator can move floats 304 within a plane perpendicular to the vertical axis of the device by providing the channel 302 at a diagonal orientation relative to the vertical axis. As shown, the slot 305 is within a vertical plane intersecting the channel 302. FIG. 3B shows the locations of five cross-sections taken at five different locations along the vertical axis of the device 301. These cross-sections, shown in FIG. 3C, demonstrate that the channel 302 can translate the float 304 within a plane perpendicular to the vertical axis and along the slot. In one embodiment, shown in FIGS. 3C and 3D, the location of the channel 302 can move from left to right as the device moves up and down. As shown in FIG. 3D, a float 304 moves laterally with the channel 302 but cannot move into the slot 305 as the fluid level rises or falls relative to the vertical axis of the device. In some embodiments, the float 304 is secured to wires, and a portion of the wires not being contained within the float can move into the slot 305. In some embodiments, multiple floats can be translated using either one or multiple channels.

Rotator for Rotating Floats

In certain embodiments, the device can be provided with one or more rotators or switching zones that allow for the rotation of adjacent floats. In some embodiments, a rotator operates on floats that are close enough to attract one another by capillary forces such that the floats act as a single, anisotropic rigid body. In some embodiments, the rotator applies a torque on this anisotropic, rigid body. In one embodiment, shown in FIGS. 4A-4H, the channel of a rotator can rotate adjacent floats 404a, 404b in either a clockwise or a counter-clockwise rotation. FIGS. 4A and 4C-4F show a counter-clockwise rotator, and FIGS. 4B and 4G-4J show a clockwise rotator. As shown FIGS. 4A-4C and 4G, in 3D renderings of the device, the channel 402 has an elongated cross-section and the channel 402 twists about the vertical axis. FIGS. 4D and 4H show the locations of six cross-sections taken at six different locations along the vertical axis of channel 402. FIGS. 4E and 4I show the cross-section of the walls 403 of the channel 402 at the 6 locations along the vertical axis. Along the vertical axis, the cross-sections of the channel 402 rotate about the vertical axis, while the location of the slot 405 remains constant. As the channel 402 rotates, the floats 404a, 404b are repelled by the walls 403 and move as the channel 402 rotates. As shown in FIGS. 4F and 4J, the floats 404a, 404b rotate about the vertical axis with the channel 402. This movement causes the floats 404a, 404b to exchange positions. For example, if float 404a is to the right of float 404b at the top of the rotator, float 404a will be to the left of float 404b at the bottom of the rotator. In some embodiments, the channel 402 rotates clockwise and the floats 404a, 404b are rotated clockwise. In other embodiments, the channel 402 rotates counterclockwise, and the floats 404a, 404b are rotated counterclockwise. In some embodiments, the floats 404a, 404b are secured to wires, and the portion of the wires not being contained within the float can move into the slot 405.

The shape of the channel 402 of the rotator is not limited except that it is elongated or has at least one long axis. Non-limiting examples of shapes of the channel 402 of the rotator include ovals, ellipses, convex polygons, non-convex or rounded polygons. For example, the channel 402 can be a triangle, a square, a rectangle, a hexagon, an octagon, or an isotoxal star.

Separator

Figure 5A:
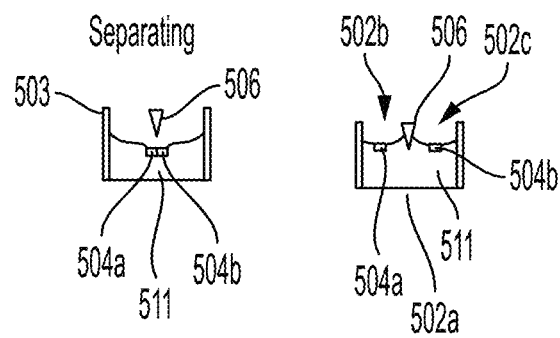
FIG. 5A illustrates a side view of a separator, in accordance with certain embodiments.
Figure 5B:
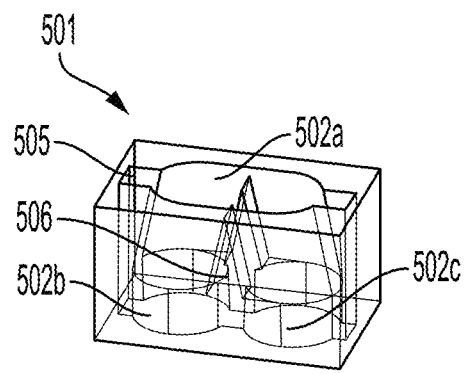
FIG. 5B illustrates a three-dimensional rendering of a separator, in accordance with certain embodiments.
Figure 5C:
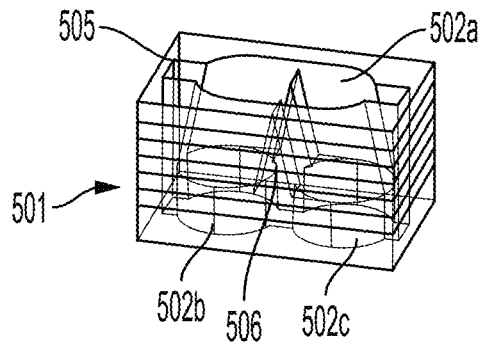
FIG. 5C illustrates locations of cross-sections of a separator, in accordance with certain embodiments.
Figures 5D, 5E:
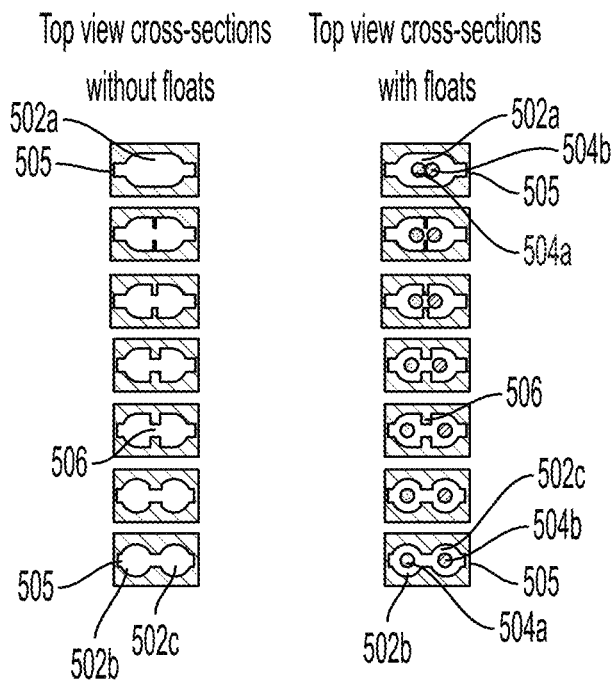
FIG. 5D illustrates cross-sections of a separator, in accordance with certain embodiments.
FIG. 5E illustrates cross-sections of a separator and the movement of floats in the channels, in accordance with certain embodiments.

In certain embodiments, the device can be provided with one or more separators or separating zones that allow the separation of two adjacent floats to allow one of the floats to move into one channel and another float to move into another channel. In some embodiments, the separator operates on floats that are close enough to attract one another by capillary forces. In one embodiment, shown in FIGS. 5A-5E, the channel of a separator can separate two adjacent floats 504a, 504b from one channel 502a at one end and steer the floats 504a, 504b into two separate channels 502b, 502c at the other end. FIG. 5A shows a side view of a separator. As the device 501 moves down relative to the fluid 511, the floats 504a, 504b in one channel 502a approach a divider 506. In some embodiments, the separator is a wedge-like wall. The repulsive forces introduced by the separator 506 are sufficient to overcome the attractive forces between the floats 504a, 504b. Since the floats 504a, 504b are repelled by the walls 503 and the divider 506, the separator steers one float 504a into one channel 502b and the other float 504b into another channel 502c. FIG. 5B shows a rendering of the device 501 with a separator. FIG. 5C shows the locations of seven cross-sections taken at seven different locations along the vertical axis of the device 501. These cross-sections, shown in FIG. 5D, demonstrate that the separator includes one channel 502a at one end and two separate channels 502b, 502c connected by a slot 505 at the other end. In one embodiment, shown in FIG. 5D, the divider 506 becomes wider along the vertical axis until the channel 502a is split into two separate channels 502b, 502c and the floats cannot move between the two channels. As shown in FIG. 5C, when two floats 504a, 504b are placed in channel 502a and the device 501 moves such that the surface of the fluid approaches the divider 506, the floats 504a, 504b are repelled by the walls and the divider 506. As a result, one float 504a is steered toward one channel 502b and the other float 504b is steered toward the other channel 502c. If the floats 504a, 504b are secured to wires, the wires can move within the slot 505 even after the floats are separated into the two channels 502b, 502c.

Rotator to Form Twists

Figures 6A, 6B, 6C:
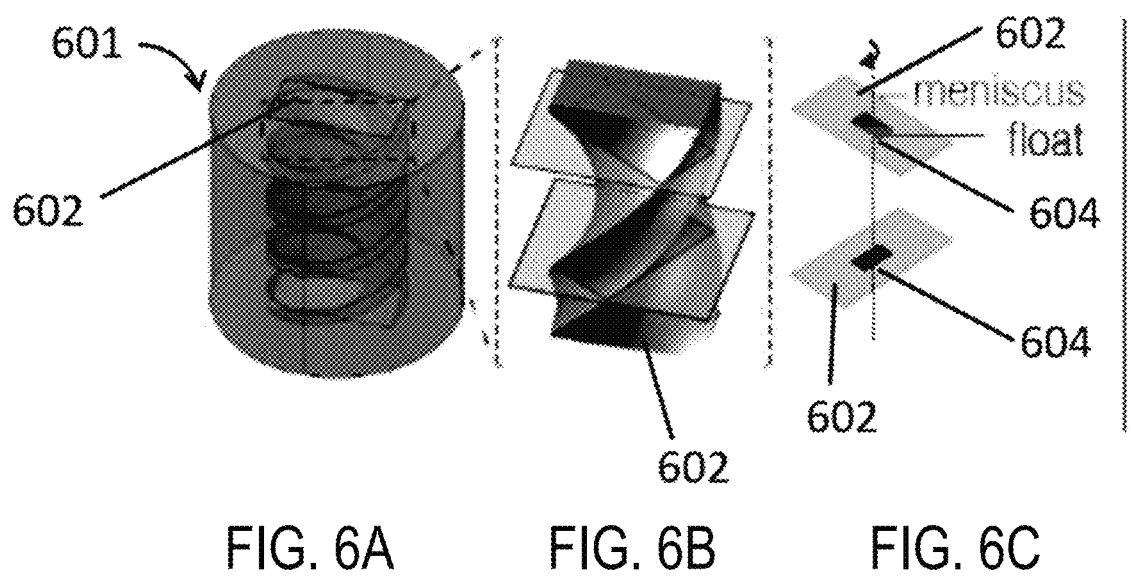
FIG. 6A illustrates a three-dimensional rendering of a rotator, in accordance with certain embodiments.
FIG. 6B illustrates a three-dimensional rendering of the inverted shape of a channel over one pitch of a rotator and the locations of two cross-sections, in accordance with certain embodiments.
FIG. 6C illustrates cross-sections of a rotator and movement of a float as the device moves up and down, in accordance with certain embodiments.

In certain embodiments, the device can be provided with one or more rotators that allow one or more floats in the channels to rotate within the channel to form a twist. In some embodiments, shown in FIGS. 6A-6C, a rotator of a device 601 can cause a float 604 to rotate within a channel 602. As shown FIG. 6A, in a 3D rendering of the device 601, the channel 602 has an elongated cross-section and the channel 602 twists about the vertical axis. FIG. 6B shows the negative space occupied by the channel and locations of two cross-sections taken at two different locations along the vertical axis of channel 602. FIG. 6C shows the cross-section of the channel 602 at the two locations and the movement of a float 604 in a channel 602. Along the vertical axis, the cross-sections of the channel 602 rotate about the vertical axis. As the channel 602 rotates, the float 604 is repelled by the walls and rotates about the vertical axis with the channel 602. Although the structure of the channel 602 of a rotator to form a twist is similar to that of a channel 402 of a rotator for rotating floats, shown in FIGS. 4A-4J, the movement of the float 604 within the channel is different. Rather than causing the rotation of two floats, each secured to at least one wire, a rotator to form a twist causes the rotation of a float secured to a plurality of wires. In addition to twisting a plurality of wires, a rotator can also twist a single wire. As the float 604 rotates about the vertical axis within the channel 602 of the rotator, the secured wires twist about each other. In some embodiments the float is non-circular. In some embodiments, the float is elongated In certain embodiments, twisting can be accomplished using two floats. In certain embodiments, twisting can be accomplished using two floats and a rotator. In this embodiment, the two floats can continuously rotate. As the device moves along the vertical axis, the floats rotate with the channel to exchange positions. In some embodiments, by continuously rotating two floats the device can form a twist. This embodiment is distinguished from the embodiment shown in FIGS. 6A-6C because this embodiment forms a twist by rotating one or more floats, each secured to at least one wire, rather than by rotating a single float secured to a plurality of wires.

As with a rotator for exchanging positions, the shape of the channel 602 of the rotator is not limited except that it is elongated or has at least one long axis. Non-limiting examples of shapes of the channel 602 of the rotator include ovals, ellipses, convex polygons, non-convex polygons, or rounded polygons. For example, the channel 602 can be a triangle, a square, a rectangle, a hexagon, an octagon, or an isotoxal star.

Asymmetric Junctions

In certain embodiments, the device can be provided with one or more asymmetric junctions or ratcheting zones that allow one or more floats in the channels to preferentially move toward certain channels. In some embodiments, asymmetric junctions introduce symmetry-breaking functions that allow multiple patterns of float motion to be programmed, depending on the direction of motion of the device (e.g., up or down). In some embodiments, the position of a float in an asymmetric junction depends on the path of the float, as shown in FIGS. 7A-7F. In some embodiments, the asymmetry of the junction permits two paths to be programmed into the same device: one that the floats follow as the device moves up, and one that the floats follow as it moves down. In certain embodiments, shown in FIGS. 7A-7F, the float 704 moves within one channel 702a (e.g., operating channel that allows movement through one or more of the various zones discussed above) when moving floats through the device 701 and the float 704 moves through another channel 702b (e.g., a return channel) when returning to the original position. FIG. 7A shows a side view of the asymmetric junction. In some embodiments, at the bottom of the device, an operating channel 702a is separated from a return channel 702b by a divider 706. As the fluid level lowers, the float 704 moves down relative to the device and is steered though the operating channel 702a by the divider 706. The float 704 is repelled from the walls 703 and the divider 706 and remains at the center of the operating channel 702a. The fluid level can decrease until the surface of the fluid is below the divider 706 and the operating channel 702a merges with the return channel 702b. The resulting repulsive capillary forces move the float 704 to the center of the merged channel 702c. When the fluid level rises again (e.g., by moving the device 701 down or injecting additional fluid into the device), the repulsive forces of the divider 706 will steer the float to the return channel 702b. In some embodiments, the return channel 702b is wider than the operating channel 702a. In some embodiments, the float 704 returns to the original position via the return channel 702b without entering any rotators. In other embodiments, the asymmetric junction is located at the top of the device. In some embodiments, the float 704 is secured to one or more wires, and the float 704 will return to the original position of the device without undoing any of the twisting or rotating operations and the braid or twist formed by the wires will remain intact.

FIG. 7B shows a rendering of a device 701 with an asymmetric junction. FIG. 7C shows the locations of 6 cross-sections taken at 6 different locations along the vertical axis of the device 701. These cross-sections, shown in FIG. 7D, demonstrate that the ratchet includes an operating channel 702a and a return channel 702b connected by a slot 705 at one end and a merged channel 702c at the other end. In one embodiment, shown in FIG. 7D, the operating channel 702a and the return channel 702b merge as the device moves along the vertical axis until they form merged channel 702c. As shown in FIG. 7E, when a float 704 in the operating channel 702a and moves down relative to the device 701, the float 704 is steered by the walls and the divider 706. As the float reaches the bottom of the device, below the divider 706, the float moves toward the center of the merged channel 702c. As shown in FIG. 7F, when device 701 changes direction and the float 704 begins moving up relative to the device, the float 704 approaches and is repelled by the divider 706, which steers the float to the center of the return channel 702b. In some embodiments, the float 704 can travel along one pathway when moving down relative to the device 701 and along a different pathway when moving up relative to the device 701. In some embodiments, the floats are secured to wires, and the wires can move within the slot 705 when moving through the operating channel 702a, the return channel 702b, and the merged channel 702c. In some embodiments, as the floats secured to wires travel through the return channel, the braid or twist remains intact.

Twisting Ratchets

In other embodiments, shown in FIGS. 8A-8L, the twisting ratchet relies on contact angle hysteresis to break symmetry and return the floats to the original position without unwinding the braid. In this embodiment, contact-angle hysteresis arises from microscopic pinning sites that are present on a solid surface. In this embodiment, the shape of the cross-section of a twisting ratchet is designed so that the approaching contact angle 813a formed between the device 801 moves down relative to the fluid 811 is different from the receding contact angle 813b formed when the device 801 moves up relative to the fluid. As a result, the repulsive capillary forces felt by a float 804 as the device 801 moves up are different from the repulsive capillary forces felt by the float as the device 801 moves down, and the movement of the float in the channel depends on the direction of movement in the vertical direction.

As shown in FIG. 8A in a 3D rendering of one embodiment of the device 801, similar to FIG. 6A, the channel 802 has an elongated cross-section and the channel 802 twists about the vertical axis. However, in one embodiment with the twisting ratchet shown in FIG. 8A, contact angle hysteresis occurs due to a slot 805. FIG. 8B shows the negative space occupied by the channel 802 and locations of two cross-sections taken at two different locations along the vertical axis of channel 802. FIG. 8C shows the cross-section of the channel 802 at the two locations and the movement of a float 804. FIG. 8D shows a rendering of this embodiment of the device 801 with a twisting ratchet with contact angle hysteresis. FIG. 8E shows the locations of six cross-sections taken at six different locations along the vertical axis of the device 801. In one embodiment, these cross-sections, shown in FIG. 8F, demonstrate that elongated channel 802 rotates about the vertical axis, but the slot 805 does not rotate. In this embodiment, the orientation of the elongated channel 802 relative to the slot 805 varies as device moves along the vertical axis, and the contact angles when the device moves up are different from the contact angles when the device moves down.

Figures 8G, 8H:
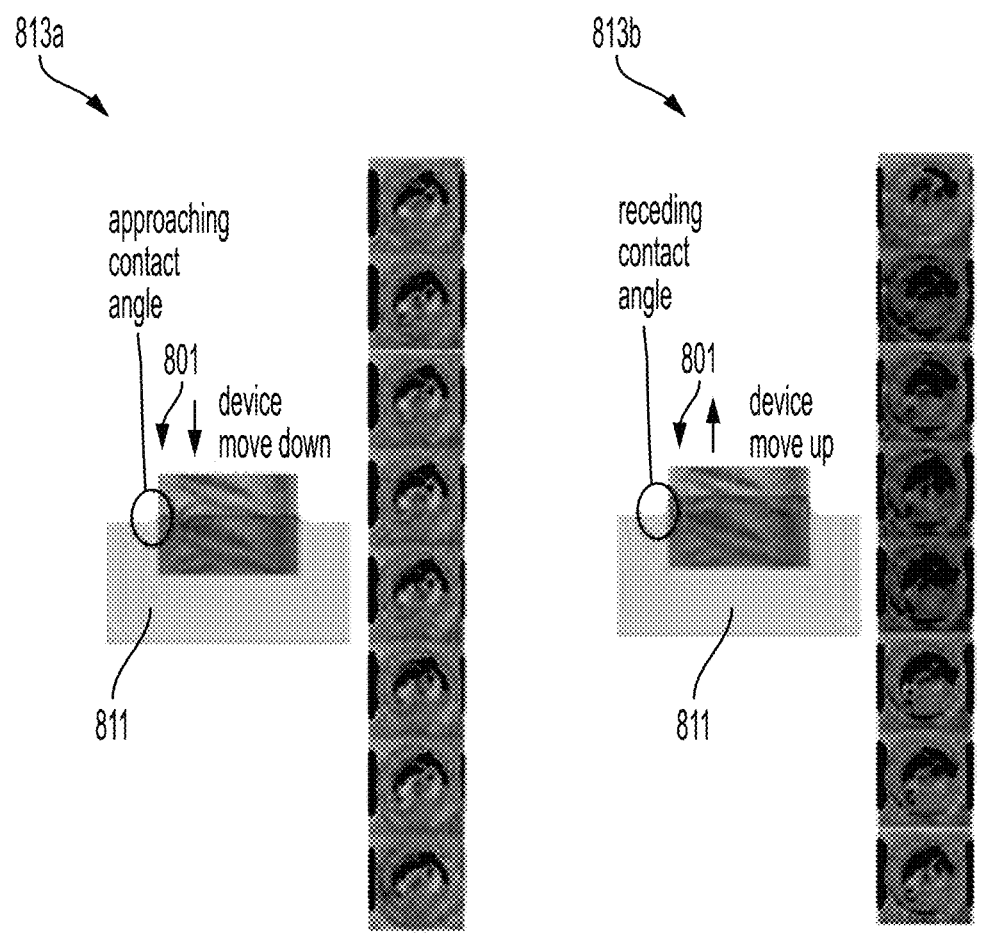
FIG. 8G illustrates a schematic of a device with a twisting ratchet moving down and inducing an approaching contact angle and photographs of cross-section of the device, in accordance with certain embodiments.
FIG. 8H shows a schematic of a device with a twisting ratchet moving up and inducing a receding contact angle and photographs of cross-section of the device, in accordance with certain embodiments.

In one embodiment, FIG. 8G shows a schematic of a device moving down and inducing an approaching contact angle 813a between the wall and the fluid 811 and photographs of the cross-section of the device at different points along the vertical axis. In this embodiment, FIG. 8H shows a schematic of a device moving up and inducing a receding contact angle 813b between the wall and the fluid 811 and photographs of the cross-section of the device at different points along the vertical axis. In this embodiment, the approaching contact angle and the receding contact angle are different, and the float's movement within the channel as the device moves up is different from the float's movement within the channel as the device moves down. As shown by the counter-clockwise arrow in the photographs of FIG. 8G, the float rotates smoothly counterclockwise about the vertical axis with the channel as the device 801 moves down. In one embodiment, the float is secured to multiple wires, and those wires twist about each other. In contrast, as shown by the clockwise arrow in the photographs of FIG. 8H, the float initially rotates clockwise about the vertical axis as the device 801 moves up. If the float continued to rotate clockwise, the wires would become untwisted. However, as shown by the counterclockwise arrows in the fourth and eight cross-sections of FIG. 8H, a snap-back event occurs to reverse the clockwise rotation. In this way, the float is prevented from making a full rotation as the device returns to its original position, and the wires are prevented from untwisting. Instead the float wobbles back and forth without untwisting the wires. In this embodiment, the twisting ratchet rotates floats while the device is moving in one direction but not when it is moving in the other.

Figure 8I:
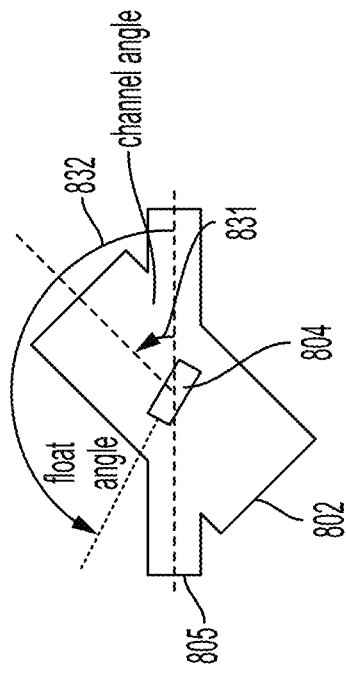
FIG. 8I shows a cross-section of a twisting ratchet with the channel and angle and float angle, in accordance with certain embodiments.
Figure 8K:
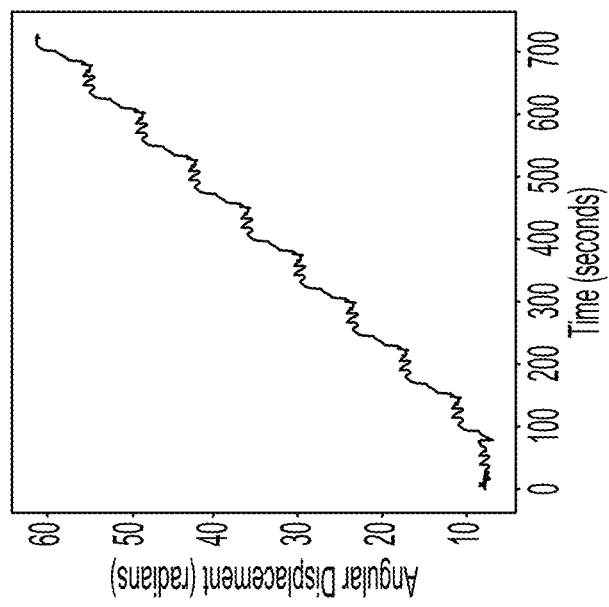
FIG. 8K shows the angular displacement of a float in a twisting ratchet over time as a device moves up and down, in accordance with certain embodiments.
Figure 8J:
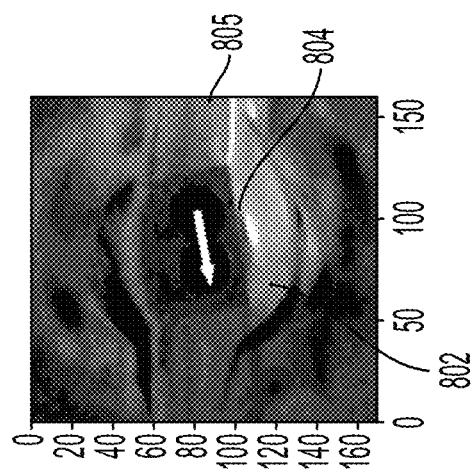
FIG. 8J shows a photograph of a float in a twisting ratchet.

In one embodiment, FIGS. 8I-8K show the angular displacement of a float 804 in n twisting ratchet as the device moves up and down. FIG. 8I shows a schematic of a cross section of a float 804 in a channel 802 with a slot 805. The angular displacement of the float 804 is the difference between the channel angle 831 and the float angle 832. FIG. 8J shows a photograph of a float 804 in a channel 082 with a slot 805. FIG. 8K shows the cumulative angular displacement of the float 805 over time as the device moves vertically up and down relative to the fluid. As the device moves vertically in one direction, the angular displacement increases smoothly as the float rotates, as seen in FIG. 8G. As the device moves vertically in the opposite direction, the angular displacement oscillates, representing the snap-back events seen in FIG. 8H that prevent rotation of the float. In this embodiment, the twisting ratchet rotates floats while the device is moving in one direction but not when it is moving in the other, such that the angular displacement increases over time.

Figure 8L:
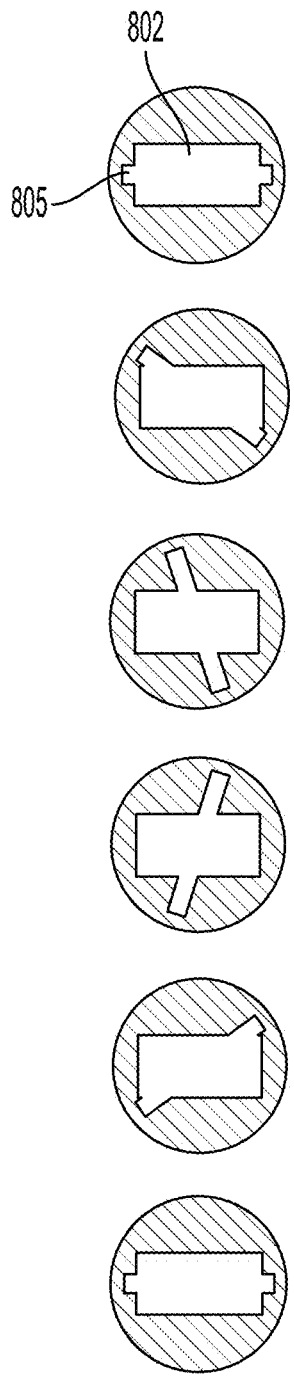
FIG. 8L shows different cross-sections of a twisting ratchet, in accordance with certain embodiments.
Figure 8M:
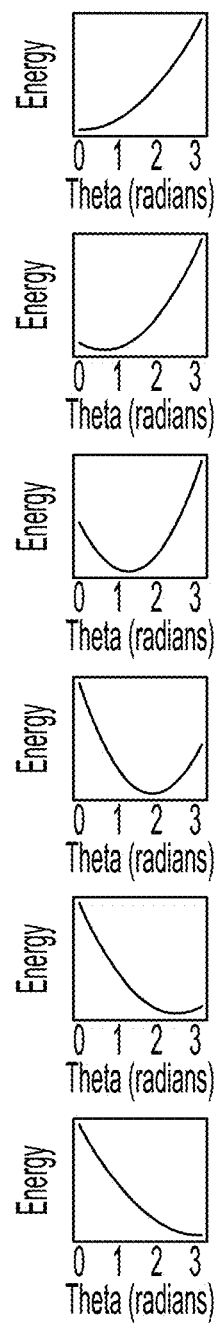
FIG. 8M shows the energy as a function of angular displacement, or float angle minus channel angle, in a twisting ratchet when the contact angle is large, in accordance with certain embodiments.
Figure 8N:
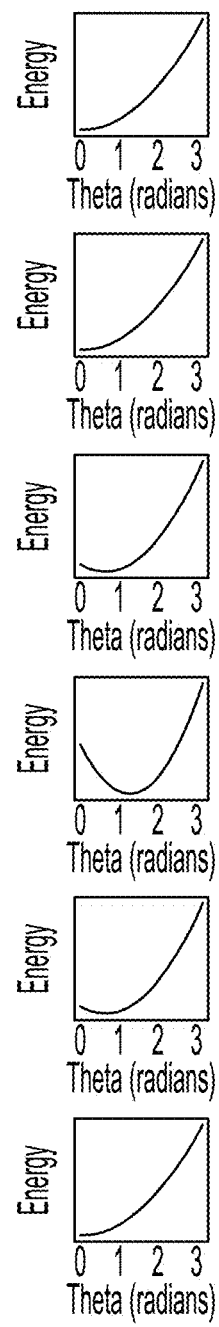
FIG. 8N shows the energy as a function of theta, or float orientation minus slot angle, in a twisting ratchet when the contact angle is small, in accordance with certain embodiments.

In one embodiment, FIGS. 8L-8N show a schematic of the energy as a function of the float orientation minus slot angle for different cross-sections of a twisting ratchet for a twist. FIG. 8L shows the geometry of a twisting ratchet with a channel 802 and a slot 805. FIGS. 8M-8N show the energy as a function of the float orientation minus slot angle for different channel 802 angles. When the contact angle is large as shown in FIG. 8M, the minimum-energy orientation of the float aligns with the rotation of the channel 802, resulting in the smooth rotation seen in FIG. 8G. When the contact angle is small, as shown in FIG. 8N, the minimum energy orientation of the float oscillates about the orientation of the slot, resulting in the snap back events seen in FIG. 8H.

Figure 8O:
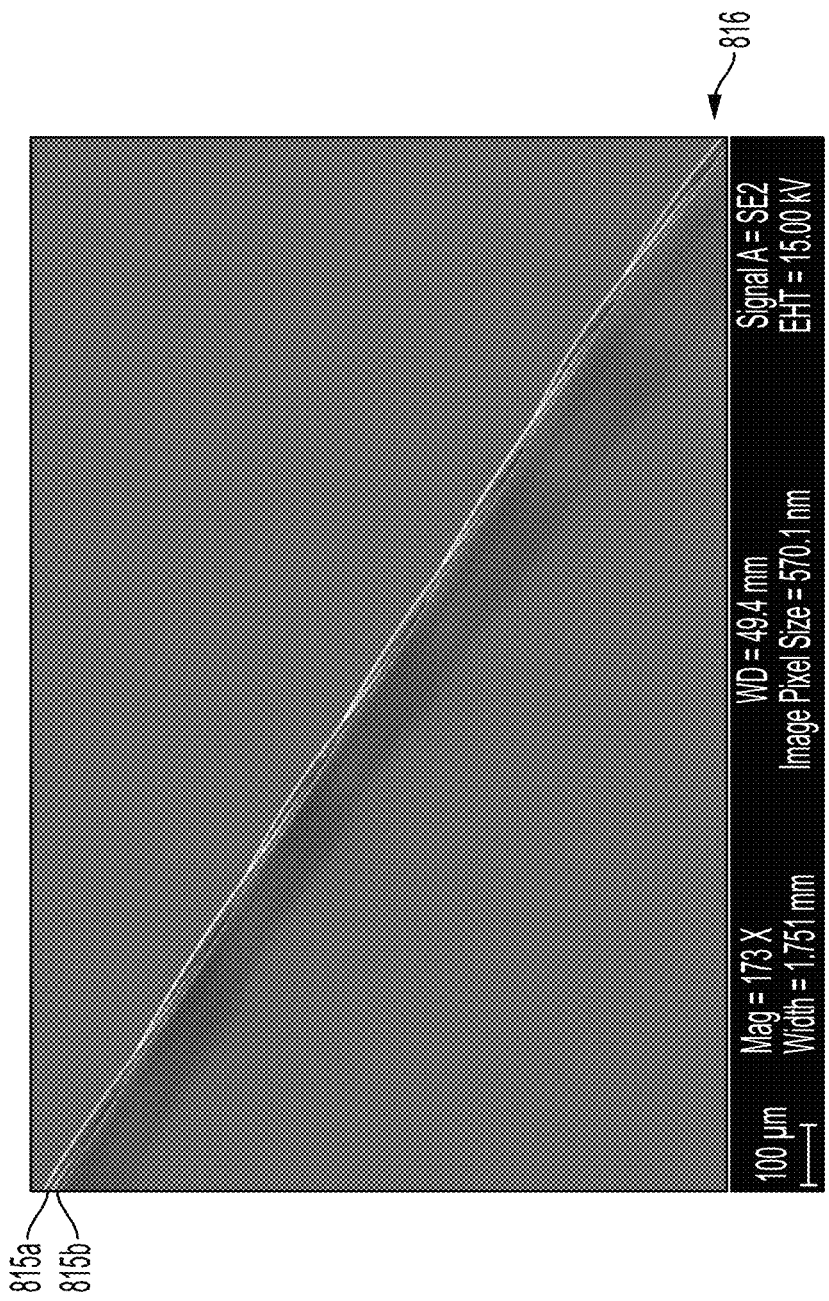
FIG. 8O is a scanning electron micrograph of a twist assembled with Kevlar fibers that are about 5 μm in diameter, where the twist is formed using a twisting ratchet.

FIG. 8O shows an SEM image of a two-strand twist 816 formed by two wires 815a, 815b using a float in a twisting ratchet. The twist shown in FIG. 8O was formed by securing two wires 815a, 815b to a single float and moving the float multiple times through a twisting ratchet, causing the float to rotate and the two wires 815a, 815b to twist around each other.

In certain embodiments, a braid with a repeating pattern is formed by moving the device up and down relative to the fluid. In this embodiment, a sequence of operations including rotating, separating, and translating, can be repeated indefinitely. To avoid undoing a braid or twist at a rotator when reversing direction and returning floats to the original vertical position, a twisting ratchet can be used. In some embodiments, breaking symmetry can be done by using a twisting ratchet so that floats can return to the original vertical position without unwinding the braid structure. In some embodiments, breaking symmetry can be done by using an asymmetric junction that includes a separate channel for returning the floats to the original vertical position. In other embodiments, a twisting ratchet relies on contact angle hysteresis to return floats to the original position.

Combination of Translators, Asymmetric Junctions, and Rotators

Figure 9A:
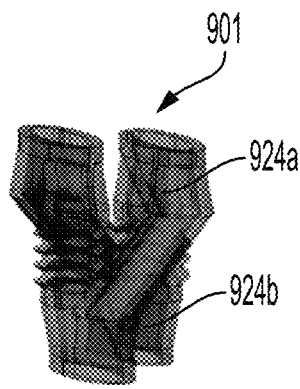
FIG. 9A illustrates a three-dimensional rendering of a hierarchical twisting device, in accordance with certain embodiments.
Figure 9B:
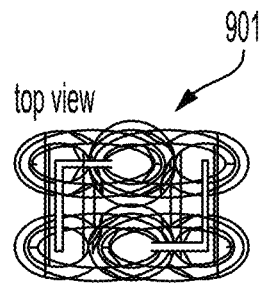
FIG. 9B a top view of a hierarchical twisting device, in accordance with certain embodiments.
Figure 9C:
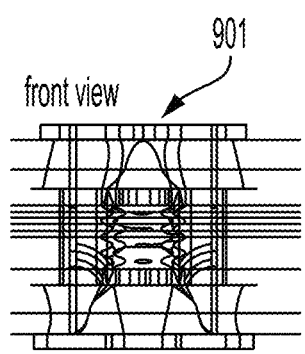
FIG. 9C illustrates a side view of a hierarchical twisting device and locations of cross-sections of translators, rotators, and asymmetric junctions within the device, in accordance with certain embodiments.
Figure 9D:
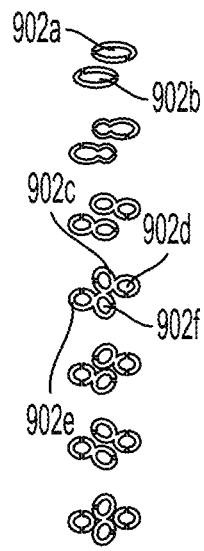
FIG. 9D illustrates cross-sections of a hierarchical twisting device in accordance with certain embodiments.

In certain embodiments, shown in FIGS. 9A-9F, translators, asymmetric junctions, and rotators can be combined to form a hierarchical twist. In some embodiments, a hierarchical twist is formed by a plurality of twists that are twisted about each other. FIG. 9A shows a rendering of a hierarchical twisting device. FIG. 9B shows a top view of a hierarchical twisting device. FIG. 9C shows the locations of eleven cross-sections of the hierarchical twisting device shown in FIG. 9D. As seen in FIG. 9C, there can be two channels 902a, 902b at the top of the hierarchical rotator. An asymmetric junction 924a splits one channel 902a into two channels 902c, 902d and the other channel 902b into two channels 902e, 902f. Along the vertical axis of the device 901, the outer channels 902d, 902e exchange positions but do not rotate about a vertical axis. Along the vertical axis of the device 901, the inner channels 902c, 902f rotate about a vertical axis but do not exchange positions. Near the bottom of the hierarchical twisting zone, an asymmetric junction 924b merges the channels 902c, 902e into one channel 902g and the channels 902d, 902f into a second channel 902h.

Figure 9E:
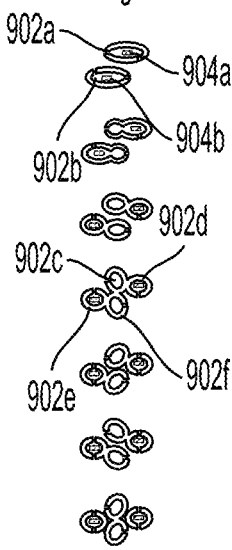
FIG. 9E illustrates the movements of floats in a hierarchical twisting device as the floats move down the device to form a higher order twist, in accordance with certain embodiments.

As shown in FIG. 9E, as the floats move down relative to the device 901, the floats 904a, 904b rotate, forming a higher order twist. At the top of the hierarchical twist, one float 904a is in channel 902a, and one float 904b is in channel 902b. As the floats 904a, 904b move down, an asymmetric junction 924a at the top steers the float 904a in the channel 902a into the channel 902d and steers the float 904b in the channel 902b into the channel 902e. As the channels 902d, 902e exchange positions, the floats 904a, 904b move with the channels to exchange positions, forming a higher order twist. At the bottom of the hierarchical twist, the channels 902c, 902e merge into channel 902g, and the channels 902d, 902f merge into channel 902h. At the bottom of the twist, the float 904a is in the merged channel 902h and the float 904b is in the merged channel 902h.

Figure 9F:
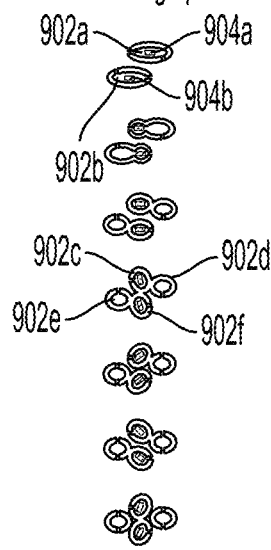
FIG. 9F illustrates the movements of floats in a hierarchical twisting device as the floats move up the device to form a lower order twist, in accordance with certain embodiments.

As shown in FIG. 9F, as the floats move up the hierarchical twist, the floats rotate within each channel, forming a lower order twist. At the bottom of the hierarchical twist, as the floats 904a, 904b move back up, the asymmetric junction 924b steers float 904a in channel 902h into channel 902f and steers float 904b in channel 902g into channel 902c. As the channels 902c, 902f rotate, the floats 904a, 904b rotate within the channels, forming a lower order twist. At the top of the channel, the float 904a returns to channel 902a, and the float 904b returns to channel 902b. If the floats reverse direction and begin moving down again, the asymmetric junction 924a will steer float 904a back into channel 902d and float 904b back into channel 902e. By cycling up and down, a hierarchical twist can be formed with any number of repeat units.

By connecting multiple wires to each float, one can make hierarchical twists. As the floats move up and rotate within the individual channels, the secured wires twist about each other, forming a lower order twist. As the floats move down and rotate, these lower order twists are twisted about each other, forming a higher order twist. For example, a 2×2 twist can be made by securing two wires to each of two floats. A 2×2 twist includes two two-strand twists twisted around each other.

Micropatterned Surfaces

In some embodiments, shown in FIGS. 10A-10D, rotating and twisting can be accomplished by surface features on the walls 1003 of the channel 1002, rather than by the macroscopic cross-section. In the embodiments shown in FIGS. 4A-4J and 6A-6C, rotating and twisting can occur because the macroscopic cross-section of the channel changes along the vertical axis, causing the shape of the meniscus to change as the device 1001 moves up and down relative to the fluid. Similarly, the locations and shape of surface features on the walls 1003 of the channel can cause the shape of the meniscus to change as the device 1001 moves up and down relative to the fluid. In some embodiments, the surface features control the contact angle by pinning the interface between the fluid, air and channel as the device moves relative to the fluid. In some embodiments, as the water level moves down inside of a channel, the surface features "pull" on the meniscus, resisting the downward motion of the interface at those specific points. In some embodiments, the surface features can create an asymmetry for torque, allowing for rotating or twisting even with macroscopically circular channels.

Figure 10A:
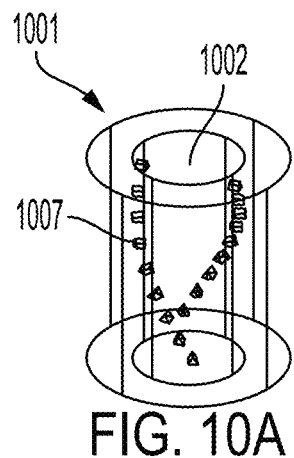
FIG. 10A illustrates of a rendering of a channel with surface features on the walls.
Figure 10B:
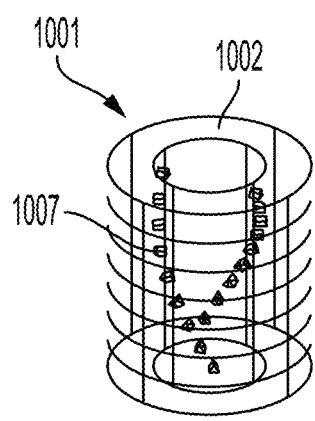
FIG. 10B illustrates the locations cross-sections of a channel with surface features on the walls.
Figure 10C:
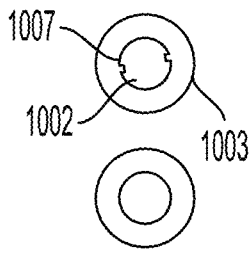
FIG. 10C illustrates cross-sections of a channel with surface features on the walls.
Figure 10D:
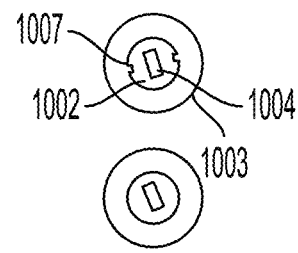
FIG. 10D illustrates the movement of a float in a channel with surface features on the walls.

In one embodiment, shown in FIGS. 10A-10C, the surface features 1007 are arranged at distinct points on the walls 1003 of the channel 1002. As shown in FIG. 10A, two sets of surface features are arranged in a helix or spiral along the vertical axis. FIG. 10B shows the locations of six cross-sections shown in FIG. 10C. As shown in FIG. 10C, in some cross-sections there are two surface features opposite each other, and the location of these surface features rotates along the vertical axis. As shown, in FIG. 10D, these surface features can pin the meniscus as a float 1004 moves down the channel, resulting in a preferred orientation of the float 1004 relative to the surface features. In this embodiment, the float 1004 rotates to maintain this preferred orientation relative to the surface features 1007.

In some embodiments, a channel 1002 with surface features can perform the rotating operations shown in FIGS. 4A-J, the twisting operations shown in FIGS. 6A-6C, or the ratcheting operations shown in FIGS. 8A-8G. In these embodiments, the surface features are a different way to manipulate the meniscus to achieve similar results as the cross-sectional geometry-based approach in FIGS. 4A-4J, FIGS. 6A-6C, and FIGS. 8A-8G. A channel with surface features can be used to rotate two floats, each secured to one or more wires, similar to the elongated channel shown in FIGS. 4A-J. A channel with surface features can be used to twist a plurality of wires secured to a single float, similar to the elongated channel shown in FIGS. 6A-6C.

In some embodiments, surface features can have a size between microns and millimeters. In some embodiments the surface features have a size of 1-10 µm, 10-20 µm, 20-30 µm, 30-40 µm, 40-50 µm, 50-60 µm, 70-80 µm, 80-90 µm, 90-100 µm, 100-150 µm, 150-200 µm, 200-250 µm, 250-300 µm, 350-500 µm, 500-550 µm, 550-600 µm, 650-700 µm, 750-800 µm, 850-900 µm, 950-1000 µm, 1000-1500 µm, 1500-2000 µm, 2000-2500 µm, 2500-3000 µm, 3000-3500 µm, 3500-4000 µm, 4500-5000 µm, 4500-5000 µm, 5000-6000 µm, 6000-7000 µm, 7000-8000 µm, 8000-9000 µm, and 9000-10000 µm.

In some embodiments the surface features form teeth on the walls of the channels. In some embodiments, the shapes of the surface features are like circles, triangles, or trapezoids.

Figure 11H:
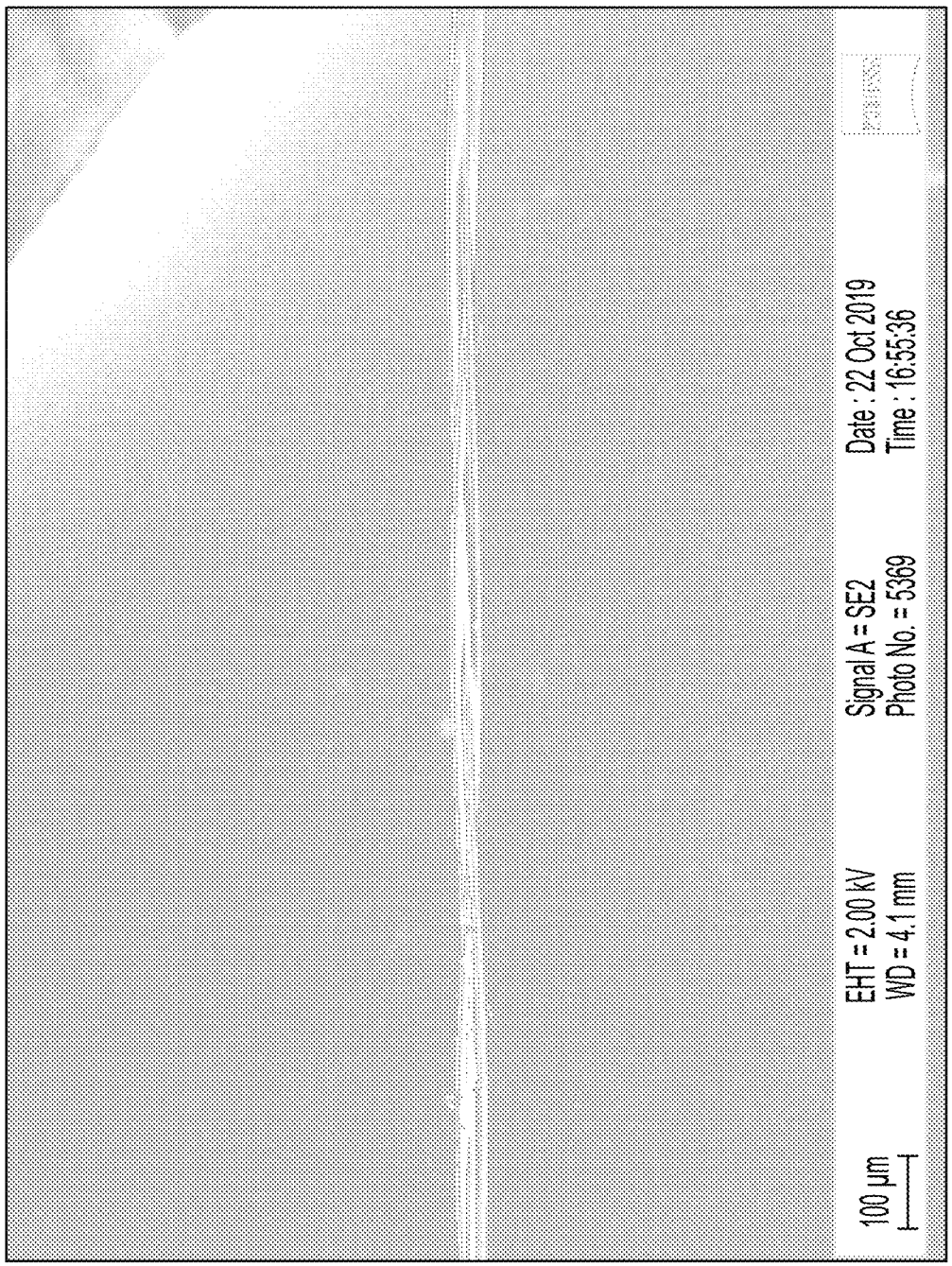
FIG. 11H is a scanning electron micrograph of a three-strand braid assembled with Kevlar fibers that are about 5 μm in diameter, in accordance with certain embodiments.

Exemplary Device Including Pre-Programmed Separators, Rotators and Asymmetric Junctions In some embodiments, combinations of separators, rotators, translators, and asymmetric junctions can be used to program floats to move in any two-dimensional pattern. In some embodiments, the design of the device is programmed to move floats in a particular pattern. As FIGS. 11A-M shows an exemplary device with separators, rotators, and asymmetric junctions designed to form a three-strand braid. FIG. 11A shows a photograph of a side view of a three-strand device 1101. FIG. 11B shows a schematic side view of the device 1101 showing the locations of three floats 1104a, 1104b, and 1104c at multiple locations along the vertical axis of the device as the device 1101 moves up relative to the surface of the fluid. FIG. 11C shows the movement of the floats within a cross-section at each location indicated in FIG. 11B. The curved arrows indicate locations where two adjacent floats rotate at a rotator. The first curved arrow shows rotation of the first float 1104a and the second float 1104*b*, while the second curved arrow shows rotation of the first float 1104*a* and the third float 1104*c*.

FIG. 11D shows photographs of the cross section of the device at various locations as the device moves up relative to the surface of the fluid. As shown in FIG. 11D, the device 1101 moves up, and the floats 1104*a*, 1104*b*, and 1104*c* move down relative to the device, the floats move through various operation zones, including rotators and separators. In some embodiments, a wire 1115*a*, 1115*b*, 1115*c* is secured to each of the floats 1104*a*, 1104*b*, 1104*c*. FIG. 11E shows the movement of the wires 1115*a*, 1115*b*, 1115*c* as the floats 1104*a*, 1104*b*, 1104*c* move through the operation zones of the device 1101 to form a braid. FIG. 11G shows the braid group formed by a three-strand braiding device. FIG. 11H shows an optical micrograph of a braid formed by a braiding device.

FIG. 11F shows photographs of the cross section of the device at various locations as the device moves down relative to the surface of the fluid. As shown in FIG. 11F, when the floats 1104*a*, 1104*b*, 1104*c* reach the bottom of the device 1101, the device reverses direction and begins moving downward. At this location, the floats 1104*a*, 1104*b*, 1104*c* are steered by two asymmetric junctions into a channel for return to the top of the device. As the device moves down relative to the surface of the fluid, the floats move up relative to the device 1101. As shown in FIG. 11F, the floats 1104*a*, 1104*b*, 1104*c* do not pass through any rotators and remain in the same positions within the plane perpendicular to the vertical axis as they move to the top of the device, permitting the braid to remain intact.

FIGS. 11I-11M are schematics showing the exemplary three-strand braiding device 1101, composed of a sequence of asymmetric junctions 1124, rotators 1122, and separators 1123. FIG. 11I shows a rendering of the three-strand device. FIG. 11J shows the locations of the cross-sections taken at different locations along the vertical axis of the device 1101. These cross-sections are shown in FIG. 11K. FIG. 11L shows the movement of the floats 1104*a*, 1104*b*, and 1104*c* down the device 1101, and FIG. 11M shows the movement of the floats 1104*a*, 1104*b*, and 1104*c* up the device.

As shown in FIGS. 11L and 11M, the three-strand device includes an asymmetric junction 1124*a* at the top of the device and an asymmetric junction 1124*b* at the bottom of the device. At the top of the device, one float 1104*a* is in one channel and the other two floats 1104*b*, 1004*c* are in another channel. As the floats move down into a first separator 1123*a*, the channel containing floats 1104*b* and 1104*c* splits into two channels, each containing one float. As the floats approach a first rotator 1122*a*, the channels containing the floats 1104*a* and 1104*b* merge to form an elongated channel. This elongated channel then rotates, causing the floats 1104*a* and 1104*b* to rotate. As the floats continue downward to a second separator 1123*b*, the elongated channel containing 1104*a* and 1104*b* splits into two channels, each containing one float. As the floats approach a second rotator 1122*b*, the channels containing floats 1104*a* and 1104*c* merge to form an elongated channel. This elongated channel rotates, causing the floats 1104*a* and 1104*c* to rotate. As the floats approach the bottom of the device, the floats enter an asymmetric junction 1124*b* which steers the float 1104*b* to a wide channel at the left of the device and the floats 1104*c* and 1104*a* to a wide channel at the right of the device. The device 1101 then reverses direction and the floats 1104*a*, 1104*b*, and 1104*c* move up to the top of the device in the wide channels without entering any rotators or separators. At the top of the device an asymmetric junction 1124*a* steers the floats to the channels at the initial position. The device 1101 then changes direction and the floats move down through the rotators and separators in another cycle. This cyclical process can be repeated to form a braid of the desired number of repeating units.

In some embodiments, during the process shown in FIGS. 11D, 11F, and 11L-M, a wire can be secured to each of the floats 1104*a*, 1104*b*, and 1104*c*. As the floats move down through the separators and rotators, the wires can move into the slots 1105. In this way the wires can be switched, and a braid can be formed. However, the floats cannot enter the slots and are confined to the channels. As the floats move up through the wide channels after being steered by the asymmetric junction, the floats do not enter the separators and rotators and can remain at the center of the wide channels. As a result, the braid remains intact as the floats return to the top of the device.

The device is not limited to the exemplary three-strand device shown in FIGS. 11A-11M. In some embodiments, a device can be designed with any combination or sequence of separators, translators, rotators, or asymmetric junctions to form a braid with a desired pattern. In some embodiments, the braid can be formed using any number of wires. In some embodiments the braid is formed from 2, 3, 4, 5, 6, 7, 8, 9, or 10 wires. In some embodiments, the braid is formed from 10-20, 20-30, 30-40, 40-50, 50-60, 70-80, 80-90, 90-100, 100-200, 200-300, 300-400, 400-500, 600-700, 700-800, 800-900, or 900-1000 wires, and any integer in between. To form a braid or twist with a repeating pattern, the device can include an asymmetric junction that allows the floats to be cycled up and down repeatedly without unwinding the braid or twist.

Exemplary Device for Making Braids with Arbitrary Patterns

In another embodiment, the movement of floats is not programmed into the structure of the device, and the device can move floats in an arbitrary pattern. In some embodiments, the movement of floats is programmed by the movement of the device relative to the water. In some embodiments, the device comprises programmable junction that can steer a float to a zone (e.g. to a rotator, separator, or translator) by moving the float to an asymmetric junction and reversing direction to steer the float toward the corresponding zone. FIGS. 12A-12D show an exemplary four-strand programmable braiding device 1201 with a programmable junction comprising asymmetric junctions that can each steer a float to a rotator. In some embodiments, a programmable junction allows for four different float paths to be programmed into the same stretch of the device. In some embodiments, the path of the float is selected by reversing the vertical motion of the device at heights corresponding to asymmetric junctions. FIGS. 12A-12B show a side view of the device. As shown in FIG. 12B, the programmable braiding device 1201 has two or more channels 1202*a*, 1202*b*, 1202*c*, 1202*d*, and one or more rotators 1222*a*, 1222*b*, 1222*c* between each pair of channels. The rotators 1222*a*, 1222*b*, 1222*c* are each located at a different height along the vertical axis. One float connected to one or more wires is placed in each of the channels 1202*a*, 1202*b*, 1202*c*, 1202*d*. The programmable braiding device 1201 can rotate two adjacent floats by moving the device in the vertical axis to a programmable junction at the height of one of the rotators 1222*a*, 1222*b*, 1222*c* and steering the floats into a rotator using an asymmetric junction 1224*a*.

FIG. 12A shows a zoomed-in view of the programmable junction in FIG. 12B containing three asymmetric junctions 1224*a* to show how a float is steered into a rotator 1222*a*.

The asymmetric junction 1224a includes a divider 1206a which steers the float. As a float moves up a channel 1202a and approaches the divider 1206a in the asymmetric junction 1224a, the float is steered so that it remains in the channel 1202a. If the float reverses direction and begins moving down the channel 1202a after passing the divider 1206a, the divider 1202a steers the float toward a translator 1221a. As shown in FIG. 12A, a translator is a diagonal channel that connects the channel 1202a to the rotator 1222a. After the float enters the diagonal channel and moves up toward the rotator 1222a, a translator 1221b and an asymmetric junction 1224b on the other side of the rotator 1222a can steer the float into the adjacent channel 1202b. In this way, two floats from adjacent channels 1202a, 1202b can be rotated when the device 1201 moves the floats to the vertical position of the rotator 1222a between the channels 1202a, 1202b and reverses direction. Each rotator can be accessed from either above or below, so each rotator can be used to rotate floats with either handedness (i.e. clockwise, $\sigma_i^{-1}$ or counterclockwise, $\sigma_i$)

In some embodiments an arbitrary pattern of a braid can be formed by moving the programmable braiding device 1201 up and down as a function of time. In some other embodiments, an arbitrary pattern of a braid can be formed by adding or removing the fluid introduced into the channels of the braiding device so that the fluid level rises or lowers as a function of time. In some embodiments, the trajectory of the device 1201 can be programmed to rotate floats in a particular order. FIG. 12C shows the trajectory of a device 1201 in the vertical axis as a function of time. Each time the device reverses its direction at the height of a programmable junction, the two adjacent floats enter that rotator and rotate. For example, to form a fishtail braid, as shown in the schematic of FIG. 12D, the device moves up to the location of the $\sigma_1$ programmable junction and then moves downward to enter the rotator 1222a. The device next moves up to the $\sigma_2$ programmable junction and then moves downward to enter the rotator 1222b. Finally, the device moves up, past the $\sigma_3$ programmable junction before reversing direction. When the device returns to the $\sigma_3$ programmable junction, the device moves downward to enter the rotator 1222c from the opposite direction to perform a rotation with opposite handedness. This process can be repeated to form a fishtail braid with at $\sigma_1\sigma_2\sigma_3^{-1}$ pattern, as shown in FIG. 12D.

In one embodiment, FIGS. 12E-12I show movement of a float in a programmable junction comprising three asymmetric junctions 1224a, 1224b, 1224c. FIG. 12E shows a schematic of how a float can move through a programmable junction comprising three asymmetric junctions 1224a, 1224b, 1224c. FIG. 12F, shows a rendering of the programmable junction. As shown in FIG. 12F, the programmable junction comprises three channels 1202a, 1202b, 1202b. At each asymmetric junction, two of the channels intersect, and one channel is wider than the other. At asymmetric junction 1224a, channel 1202c is wider than channel 1202b. At asymmetric junction 1224b, channel 1202a is wider than channel 1202b. At asymmetric junction 1224c, channel 1202b is wider than channel 1202a. In the schematic of FIG. 12E, the wider channel at each asymmetric junction is represented by the black line, and the thinner channel at each asymmetric junction is represented by the grey line.

FIGS. 12G-12I show movement of the float through the programmable junction. The movement at each step in shown by a thick black arrow, while movement from previous steps is shown in grey. First, shown in FIG. 12G, as the device moves up relative to the fluid, the float moves within the channel 1202b to the height of the first asymmetric junction 1224a. The path of the float in this step is shown by a thick black arrow. If the device reverses direction and begins moving down at asymmetric junction 1224a, capillary forces steer the float from channel 1202b to the wider channel 1202c. If the device does not reverse direction and continues to move up, the float remains in channel 1202b and continues to asymmetric junction 1224b. As shown in FIG. 12H, of the device does not reverse direction at asymmetric junction 1224b, the float remains in channel 1202b as this channel merges with channel 1202a. As shown in FIG. 12 H, if the device reverses direction at asymmetric junction 1224b and begins moving down, capillary forces will steer the float from channel 1202b to wider channel 1202a. As the device continues to move down after reversing, as shown, in FIG. 12I, the float moves to the height of asymmetric junction 1224c. As shown in FIG. 12I, if the device does not reverse direction at asymmetric junction 1224c and continues to move down, the float remains in channel 1202a as this channel merges with channel 1202b. As shown in FIG. 12I, if the device reverses direction at asymmetric junction 1224c, capillary forces will steer the float from channel 1202a to wider 1202b. If the device reverses at asymmetric junction 1224c, the entire sequence can be repeated to form a repeating pattern. In this embodiment, a float can be steered by capillary forces from one channel to another by moving the float to the height of an asymmetric junction and then reversing the direction of motion. In some embodiments, a float can be called to a zone (e.g. to a rotator, separator, or translator) by moving the float to the asymmetric junction and reversing direction to steer the float toward the corresponding zone.

Figure 12J:
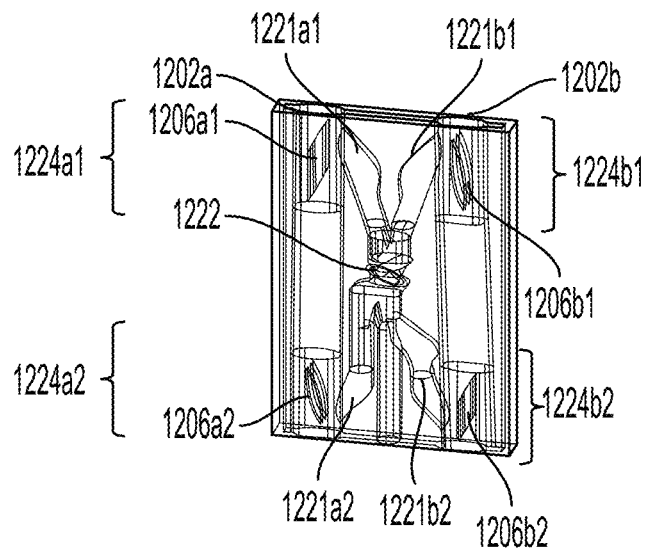
FIG. 12J illustrates a three-dimensional rendering of a programmable braiding device, in accordance with certain embodiments.
Figure 12K:
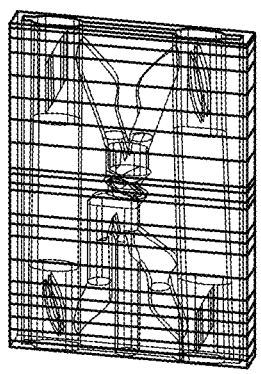
FIG. 12K illustrates the locations of cross-sections of a programmable braiding device, in accordance with certain embodiments.
Figure 12L:
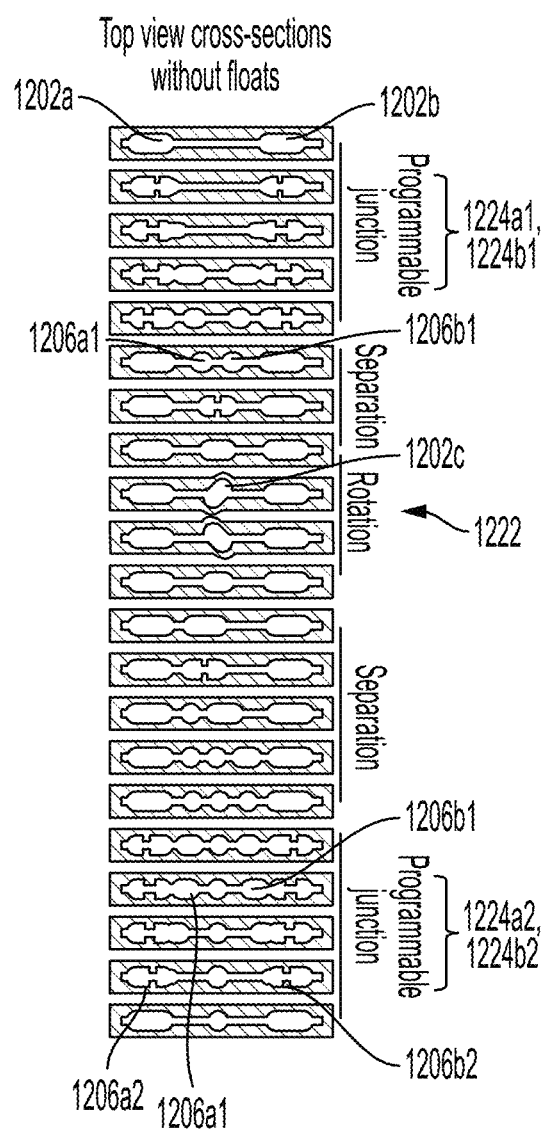
FIG. 12L illustrates cross-sections of a programmable braiding device, in accordance with certain embodiments.

FIGS. 12J-12L show an exemplary programmable braiding device for braiding two strands. FIG. 12J shows a three-dimensional rendering of the programmable braiding device. FIG. 12K shows locations of the cross-sections shown in FIG. 12H. In this embodiment, the device has two channels 1202a, 1202b and rotator 1222 located between the two channels 1202a, 1202b. Each channel includes a programmable junction above the rotator 1222 and a programmable junction below the rotator.

In other embodiments, the floats can enter the rotator by switching directions at the top programmable junction. In some embodiments, the top programmable junction steers the floats into the rotator 1222 if the floats move down and then reverse direction at the top programmable junction. The top programmable junction in the first channel 1202a contains a asymmetric junction 1224a1 with a divider 1206a1 that steers a first float in the first channel 1202a to rotator 1222 via a diagonal channel 1221a1. The top programmable junction in the second channel 1202b contains an asymmetric junction 1224b1 with a divider 1206b1 that steers a second float in the second channel 1202b to rotator 1222 via a diagonal channel 1221b1. As the floats move down through the rotator 1222, the diagonal channels 1221a1, 1221b1 merge into an elongated channel 1202c, and the floats exchange positions. The channel in the rotator 1222 splits to form two diagonal channels 1221a2 and 1221b2 below the rotator 1222. The floats are separated so that the first float is steered to one diagonal channel 1221b2 leading to the second channel 1202b and the second float is steered to another diagonal channel 1221a2 leading to the first channel 1202a.

In other embodiments, the floats can enter the rotator by switching directions at the bottom programmable junction. In some embodiments, the bottom programmable junction steers the floats into the rotator 1222 if the floats move up and then reverse direction at the top programmable junction.

The bottom programmable junction in the first channel 1202a contains an asymmetric junction 1224a2 with a divider 1206a2 that steers a first float in the first channel 1202a to rotator 1222 via a diagonal channel 1221a2. The bottom programmable junction in the second channel 1202b contains an asymmetric junction 1224b2 with a divider 1206b2 that steers a second float in the second channel 1202b to rotator 1222 via a diagonal channel 1221b2. As the floats move up through the rotator, the diagonal channels 1221a1, 1221b1 merge into an elongated channel 1202c, and the floats exchange positions. The channel in the rotator 1222 splits to form two diagonal channels 1221a2 and 1221b2 above the rotator 1222. The floats are separated so that the first float is steered to one diagonal channel 1221b2 leading to the second channel 1202b and the second float is steered to another diagonal channel 1221a2 leading to the first channel 1202a.

EXAMPLES

Certain embodiments will now be described in the following non-limiting examples.
Translator A translator can be a single, centimeter-scale channel oriented at an angle to the interface, as shown in FIGS. 3A-3D. Because the channel is hydrophilic, the interface curves upward toward the walls. The float is made from silicone elastomer that is heavier than water but can pin the interface at its boundary, resulting in an interface that curves downward toward the float, as shown in FIG. 1A. As a result, the float is repelled from the wall. As the device moves up with respect to the interface, the float is steered laterally, as shown in FIG. 3D. The motion of the float is driven by the minimization of interfacial energy and not by the fluid flow through the channels. Multiple floats can be translated using multiple channels.
Three-Strand Hair Braid To make a braid, the braidword can be programmed into the design of the device, with a 180 degree rotation of two floats being analogous to a swap or switch. These "swaps" can be serialized in conjunction with separators to yield the form of any braid in the braid group. In the language of braid theory, the structure of the device defines a sequence of braid generators, $\sigma_i$. Each $\sigma_i$ represents a strand in the $i^{th}$ place crossing over the strand in the i+1$^{th}$ place, while the operation $\sigma_i^{-1}$ represents a strand in the $i^{th}$ place crossing under the strand in the i+1$^{th}$ place. Thus, $\sigma_1 \sigma_2^{-1}$ is the repeating sequence that describes a three-strand hair braid: the strand in the leftmost position must cross over the middle strand, and then the middle strand must cross under the rightmost strand. This process can be repeated many times.

To do that, the device must also perform two other operations, besides rotating, that are essential to making real braids: separating two floats (and their secured wires) and breaking symmetry to bring floats back to their original positions without undoing the braid. These operations are shown in FIGS. 11K-M. As with rotating, separating and breaking symmetry are controlled through the shape of the walls of the device.

These operations are demonstrated by making a three-strand braid of the type usually used for hair, described by the braidword $(\sigma_1 \sigma_2^{-1})^n$, but with smaller (5 µm diameter) fibers. Such a braid can be seen in FIG. 11H and made using the device of FIGS. 11A-11G. The device created to do this, seen in FIG. 11A-B, is a series of two rotating functions with opposite handedness that achieve the two generators needed to make this braid. The device also utilizes outside "elevator" channels, which serve both to reset the floats between repeating units and to create distance between floats, which pulls or cinches the fibers, creating a tighter braid. FIG. 11H shows an optical micrograph of a three-strand braid assembled with Kevlar fibers that are about 5 µm in diameter. The motions of the floats can be seen FIGS. 11K-M. The braid seen in the micrograph has multiple repeating elementary units. The multiple repeating elementary units are repeated simply by cycling the motion of the device up and down. As shown in FIGS. 11D and 11L, as the device moves up with respect to the interface and the floats move down, the braid pattern is formed. As shown in FIGS. 11F and 11M, when the device moves down, the floats return to their starting positions through a different path, one that does not undo the braid. Because the paths of the floats through the device are deterministic in both directions, the braid pattern can extend by continuously moving the device up and down. In one embodiment, the device has made hair braids with 10 repeating units.

A three-strand braid is achieved by integrating three operations into one device. The rotator, shown in FIGS. 4A-4J causes two floats to change positions, leading to wires crossing each other. Each cross-section of a rotator is an oval whose long axis rotates 180° along the vertical z-axis. As the interface moves through each cross-section, a pair of floats aligns with the long axis of the oval, owing to repulsive capillary forces. As the interface moves through the rotator, the floats turn 180°. The handedness of the rotation is programmed into the device design. If the channel rotates counterclockwise, the float rotation is counterclockwise, and if the channel rotates clockwise, the float rotation is clockwise. A separator, shown in FIGS. 5A-5E separates two floats. When the meniscus reaches the divide (the triangle), strong repulsive capillary forces overcome the capillary attraction between the two floats and separate the floats. The asymmetric junction, shown in FIGS. 7A-7F steers a float into a different channel when the device movement is reversed. A float tends to stay at the center of the meniscus or channel due to repulsive capillary forces between the float and the walls of the channel. Thus, when the device is moved up, the float in the narrow channel on the left moves to the center of the large channel. When the device is moved back down, the float moves into the wider channel on the right. FIGS. 11A-11G shows photograph of a three-strand braiding device along with schematics and photographs of cross-sections. As shown from top to bottom in FIG. 11D, when the device is moved out of fluid, the 1104b and 1104c floats are separated, the 1104a and 1104b floats are switched ($\sigma_1$) and separated, and then the 1104a and 1104c floats are switched ($\sigma_2^{-1}$) in the opposite direction and separated. The lateral positions of each float are illustrated with respect to height, which shows the three-strand braid pattern. As shown in FIG. 11D, when floats reach the bottom of the device, the asymmetric junction steers them to the outside channels, such that the braid operation can be repeated. FIG. 11H shows an optical micrograph of a three-strand braid assembled with Kevlar fibers that are about 5 µm in diameter.
Twists An issue with this simple approach to making braids, where each rotation is constructed into the device itself, is that the height of the device scales with the number of strand switches in each repeating unit of the braid. This problem becomes more acute for braids with long repeating units. In particular, for twists or hierarchical twists (twists of twisted wires), the repeating units can be very long, as shown by the braid theory notation in FIG. 7D, which describes the pattern of switches required to make a braid in which three groups of three twisted strands are twisted around each other. This kind of pattern is useful for the Litz wires.

Another type of device can switch multiple strands simultaneously. A device to make a simple twist is shown in FIGS. 6A-6C. Multiple wires are secured to the float, which then rotates, as shown in FIG. 6C, as the device moves up with respect to the interface. To make multiple repeating units of the twist, the device must be able to move back down (with respect to the interface) without undoing the twist. To do this, a different kind of ratchet, shown in FIGS. 8A-8K is used.

The twisting ratchet in FIGS. 8A-8N is based on contact-line hysteresis. As shown in FIGS. 8G-8H, at a given height, the shape of the meniscus is different, depending on whether the device is moving up or down, owing to the difference between the advancing and receding contact angles. As shown in FIGS. 8L-8N, theoretical calculations show how to exploit this (in some cases small) difference in contact angle. If the device has a rectangular float and a radial slot, the float can rotate as the device moves in one direction, but when it moves in the other, the long axis of the float oscillates about the direction of the slot.

This twisting operation can be combined with rotation to make hierarchical twists using a compact device, as shown in FIG. 9A-9F. The floats rotate in each channel and then interchange positions. By connecting multiple wires to each float, one can make hierarchical twists. For example, a 2×2 twist can be made by securing two wires to each float. Hierarchical twisting is achieved by splitting the two twists into two directions of the device movement. When the device moves up, two individual floats twist. When the device moved down, the floats are translated through asymmetric junction channels and twist around each other to form the higher-order twist.

Multiple wires can be twisted by securing them to the same float. Similar to FIGS. 6A-6C, a float can be turned through a channel with a rectangular cross-section that is rotated along its normal axis. As shown in FIGS. 8A-8F, to ratchet, a slot that runs through the entire height of the device is added. FIGS. 8D-8F show a diagram of device and shapes of cross-sections along the height. As shown in FIG. 8H, when the device moves up, there are sudden "snap back" events (counter-clockwise arrows) that prevent the float from making a full clockwise rotation. When the device moves down, the float smoothly makes a full counterclockwise rotation. The difference between the two directions arises from the difference in advancing and receding contact angles. FIGS. 8J-8K show a schematic of the energy as a function of the float orientation relative to slot orientation inside the device at two different contact angles and for different orientations of the channel. When the contact angle is large (FIG. 8J), the minimum-energy orientation aligns with the rotation of the channel. When the contact angle is small (FIG. 8K), the minimum-energy orientation oscillates about the orientation of the slot, as seen in the experiment Programmable Braiding Device In addition to rotating, twisting, separating, and ratcheting wires with a programmed device, in some embodiments, a device can make arbitrary braids. Where used herein an arbitrary braid pattern is any braid pattern within the mathematical braid group $B_n$, where n is the number of strands in the braid. Formally, switching neighboring strands corresponds to multiplying a braid by a generator $\sigma$. Mathematicians have shown that the braid group is closed under multiplication, meaning that if all generators are available, then all possible n-strand braids can be constructed simply by combining the generators. Therefore, a device in which any two neighboring strands can be switched in any order can make an arbitrary braid. This includes all of the braids we have shown so far, including twists, hierarchical twists, and non-twisting braids, and even braids without repeating units.

Such a programmable braiding device is shown in FIGS. 12A-12D. This device consists of vertical sections corresponding to all possible 4-strand generators: $\sigma_1$, $\sigma_1^{-1}$, $\sigma_2$, $\sigma_2^{-1}$, $\sigma_3$, $\sigma_3^{-1}$. The challenge is to "call" or access the generators in arbitrary order. To do this, a variant of the asymmetric junction design is used. Again, this design relies on repulsive capillary forces. The device has zones at different heights in the device, such that when the interface is positioned within a zone and its direction reversed, it follows a particular switch. There is one programmable junction per generator. Therefore, each generator can be called in arbitrary order.

What enables this approach is the ability to move the stage in an arbitrary direction as a function of time. A major difference between this approach and the device shown in FIGS. 11A-11M is that motion of the device up and down controls the braid pattern, whereas in the device of FIGS. 11A-11M, the braid topologies are programmed into the structure of devices themselves. But in both cases, only a single degree of freedom is required: one needs only a motorized stage that can move along one axis. Thus, compared to mechanical braiding machines, which steer every single strand in two axes in a fixed pattern, this device is much simpler and requires far fewer moving parts.

The exemplary programmable braiding device design in FIGS. 12A-12C can braid any four-strand topology. The device has four main channels, each of which controls one float. A rotation between two neighboring floats can be "called" by moving the device to the right height in the right direction. For instance, in the inset, the float travels down the main channel when the device is moved out of fluid. When the float reaches the programmable junction, it stays in the main channel unless the direction of the device movement is reversed at the programmable junction. Reversing the direction moves the float into a rotator. Since the same rotator can be accessed from above and below, both handedness ($\sigma_i$ and $\sigma_i^{-1}$) can be achieved in the same section of the device. As shown in FIG. 12C, a braid $\sigma_1\sigma_2\sigma_3^{-1}$ can be made by moving the device along the trajectory z (t) shown here. This trajectory can be easily programmed into the motorized stage. As shown in FIG. 12C. the braid $\sigma_1\sigma_2\sigma_3^{-1}$ corresponds to a fishtail braid, shown schematically in FIG. 12D.

Litz Wires

In certain embodiments, the device can create a type of electrically conductive braid called a Litz wire. Litz wires are used in electronics wherever a high-frequency signal must be transmitted with minimal loss. Because of a phenomenon called the "skin effect," high-frequency currents through a cylindrical (unbraided) filament are carried along the outside of the filament. The thickness of the conducting layer, or the "skin depth," is inversely proportional to the oscillation frequency of the current; thus, at very high frequencies, the layer becomes very thin, and the current density and Ohmic heating increases, resulting in substantial signal loss.

Braided Litz wires nullify this effect in part because they are composed of many thin wires, each of which is no thicker than the skin depth. If the wires were not braided, this approach by itself would not solve the signal-loss problem: there is still electromagnetic coupling between wires that are bundled together, and as a result, the exterior wires would carry most of the current, again leading to signal loss. In a braided wire, each component wire alternates its position between the interior and exterior of the braid. Thus each component wire carries about the same amount of current, and the resulting current density and losses are minimized. Thus Litz wire is commonly used in radio-frequency applications (MHz range signals).

However, current technology demands Litz wire that operate at frequencies of 1 GHz or higher. The skin depth at these frequencies is less than 1 µm. Therefore, an effective Litz wire for these frequencies requires component wires less than a µm in diameter.

In certain embodiments, the device can create a "Nano-Litz" wire. Capillary forces work from the macroscopic scale (1 mm) down to the molecular scale (1 nm). This technology can be used to braid fibers of any thickness below or above a micrometer.

Mechanical Applications

Technologies that make ropes and cables for their mechanical strength also use twists, braids, and bundles of smaller components. If certain types of braids or twists could make such cables stronger, this device would be a useful way to construct them, since it can be used to make arbitrary braid topologies.

Another potential application is woven fibers. Kevlar, the material we have used in our proof-of-concept experiments, is used in high-strength textiles such as body armor. In certain embodiments, the device could be extended to a "capillary loom" that can weave nanofibers into new synthetic fabrics.

Medical Applications

A braiding device can also be used to form nano- or micro-sale braids from biodegradable or biological polymers for medical applications. For example, braids can be used as advanced sutures or tissue engineered scaffolds.

It will be appreciated that while one or more particular materials or steps have been shown and described for purposes of explanation, the materials or steps may be varied in certain respects, or materials or steps may be combined, while still obtaining the desired outcome. Additionally, modifications to the disclosed embodiment and the invention as claimed are possible and within the scope of this disclosed invention.

What is claimed:

1. A device comprising
    a plurality of walls defining one or more channels, wherein the one or more channels have a cross-section in a plane perpendicular to a vertical axis of the device that changes along the vertical axis; and
    one or more floats sized to allow movement of the one or more floats within said one or more channels, wherein the one or more floats have a surface characteristic that is different from the surface characteristic of the walls such that, upon contact with a fluid, said walls and said floats form different contact angles and induce a repulsive capillary force between the walls and the one or more floats at a surface of the fluid.

2. The device of claim 1, wherein at least one of the one or more channels is configured to move the one or more floats in the plane perpendicular to the vertical axis when the device moves from a first position and a second position along the vertical axis and translates within the plane perpendicular to the vertical axis between the first position and the second position.

3. The device of claim 1, wherein at least one of the one or more channels is configured to rotate two adjacent floats between a first position and a second position and comprises an elongated channel with a long axis that rotates about the vertical axis between the first position and the second position.

4. The device of claim 1, wherein at least one of the one or more channels is configured to move a first float from a wide channel at a first position along the vertical axis to a first channel at a second position along the vertical axis and to move a second float from the wide channel to a second channel at the second position, and wherein at least one of the one or more channels comprises a divider between the first position and the second position.

5. The device of claim 1, wherein at least one of the one or more channels is configured to rotate at least one of the one or more floats about the vertical axis between a first position and a second position along the vertical axis and comprises an elongated channel with a long axis that rotates about the vertical axis between the first position and the second position.

6. The device of claim 1, wherein the one or more channels are configured to return the one or more floats to a first position from a second position along the vertical axis and at least one of the one or more channels is configured to steer the one or more floats to a wide channel such that the one or more floats return to the first position through the wide channel.

7. The device of claim 1, wherein the one or more channels are configured to return the one or more floats to a first position from a second position along the vertical axis, and
    wherein a first contact angle has a first value when the device moves from the first position to the second position and a second value when the device moves from second position to the first position, and
    wherein the one or more floats rotate when the device moves from the first position to the second position, but the one or more floats do not rotate when the device moves from the second position to the first position.

8. The device of claim 1, further comprising one or more rotators configured to rotate two adjacent floats located between the one or more vertical channels;
    wherein each rotator configured to rotate two adjacent floats is at a different position along the vertical axis of the device and connected to the adjacent vertical channels via a diagonal channel; and
    wherein each vertical channel comprises a divider at the position of each rotator.

9. The device of claim 1, wherein the walls comprise surface features arranged at distinct points along the vertical axis.

10. The device of claim 9, wherein each surface feature has a size of 1-10 µm, 10-20 µm, 20-30 µm, 30-40 µm, 40-50 µm, 50-60 µm, 70-80 µm, 80-90 µm, 90-100 µm, 100-150 µm, 150-200 µm, 200-250 µm, 250-300 µm, 350-500 µm, 500-550 µm, 550-600 µm, 650-700 µm, 750-800 µm, 850-900 µm, 950-1000 µm, 1000-1500 µm, 1500-2000 µm, 2000-2500 µm, 2500-3000 µm, 3000-3500 µm, 3500-4000 µm, 4500-5000 µm, 4500-5000 µm, 5000-6000 µm, 6000-7000 µm, 7000-8000 µm, 8000-9000 µm, or 9000-10000 µm.

11. The device of claim 1, wherein upon contact with a fluid, said walls and said floats form different contact angles such that the contact angle of the walls is greater than 90°, and the contact angle of the one or more floats is less than 90°; or
    wherein upon contact with a fluid, said walls and said floats form different contact angles such that the contact angle of the walls is less than 90°, and the contact angle of the one or more floats is greater than 90°.

12. The device of claim 1, wherein the walls are hydrophilic, and the one or more floats are hydrophobic; or wherein the walls are hydrophobic, and the one or more floats are hydrophilic.

13. The device of claim 1, wherein the device comprises a material selected from the group consisting of glass, steel, aluminum, titanium, 3D-printed polymer, polydimethylsiloxane, polypropylene, polyvinyl chloride, polystyrene, nylon, polytetrafluoroethylene, acrylates, polymethylmethacrylate, thermoplastic polyurethanes, and combinations thereof.

14. The device of claim 1, wherein at least one of the walls of the device and the one or more floats are treated with a surface treatment selected from the group consisting of plasma-treatment, hydroxyl groups, amine groups, fluorinated silanes, fluoropolymers, oils, wax, nanopatterning, micropatterning, nanostructures, microstructures, particle deposition, vapor deposition, sol-gel treatment, and combinations thereof.

15. The device of claim 1, wherein at least one of the walls of the device and the one or more floats have a roughened surface.

16. The device of claim 1, wherein the one or more floats comprise a material selected from the group consisting of glass, steel, aluminum, titanium, 3D-printed polymer, polydimethylsiloxanefluoropolymers, wax, and combinations thereof.

17. The device of claim 1, further comprising an attractive force between the one or more floats.

18. The device of claim 1, wherein the one or more floats have a shape selected from the group consisting of circles, ovals, convex polygons, non-convex polygons, rounded polygons, and combinations thereof.

19. The device of claim 1, wherein the one or more channels have a shape selected from the group consisting of circles, ovals, convex polygons, non-convex polygons, rounded polygons, and combinations thereof.

20. The device of claim 1, wherein each of the one or more floats is capable of receiving a wire.

21. The device of claim 20, wherein each of the one or more floats is configured to be secured to at least one wire.

22. The device of claim 1, wherein the fluid is water, an aqueous solution, oil, a non-polar solvent, an organic solvent, or mercury.

* * * * *